US010545657B2

(12) United States Patent
Zambetti et al.

(10) Patent No.: US 10,545,657 B2
(45) Date of Patent: Jan. 28, 2020

(54) USER INTERFACE FOR MANIPULATING USER INTERFACE OBJECTS

(71) Applicant: Apple Inc., Cupertino, CA (US)

(72) Inventors: Nicholas Zambetti, San Francisco, CA (US); Imran Chaudhri, Cupertino, CA (US); Jonathan R. Dascola, San Francisco, CA (US); Alan C. Dye, San Francisco, CA (US); Christopher Patrick Foss, San Francisco, CA (US); Aurelio Guzman, San Jose, CA (US); Chanaka G. Karunamuni, San Jose, CA (US); Duncan Robert Kerr, San Francisco, CA (US); Stephen O. Lemay, Palo Alto, CA (US); Natalia Maric, San Francisco, CA (US); Christopher Wilson, San Francisco, CA (US); Eric Lance Wilson, San Jose, CA (US); Lawrence Y. Yang, San Francisco, CA (US); Gary Ian Butcher, San Jose, CA (US); Anton M. Davydov, Gilroy, CA (US); Dylan Ross Edwards, San Jose, CA (US); Jonathan P. Ive, San Francisco, CA (US); Zachery Kennedy, San Jose, CA (US); Nicholas V. King, San Jose, CA (US); Daniel Trent Preston, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/049,052

(22) Filed: Feb. 20, 2016

(65) Prior Publication Data

US 2016/0170608 A1    Jun. 16, 2016

Related U.S. Application Data

(63) Continuation of application No. 14/913,349, filed on Feb. 19, 2016, and a continuation-in-part of application No. 14/476,657, filed as application No. PCT/US2014/053957 on Sep. 3, 2014, now abandoned.

(Continued)

(51) Int. Cl.
*G06F 3/00* (2006.01)
*G06F 3/0488* (2013.01)
(Continued)

(52) U.S. Cl.
CPC ............ *G06F 3/0488* (2013.01); *G06F 1/163* (2013.01); *G06F 3/0482* (2013.01)

(58) Field of Classification Search
CPC ............................ G06F 1/1626; G06F 3/0482
(Continued)

(56) References Cited

U.S. PATENT DOCUMENTS 6,336,126 B1    1/2002  Bjorklund et al.
6,556,222 B1 *  4/2003  Narayanaswami .. G04G 9/0064
                                                  368/295

(Continued)

FOREIGN PATENT DOCUMENTS

CN      1811899 A    8/2006
CN    101876877 A   11/2010
(Continued)

OTHER PUBLICATIONS

Office Action received for Danish Patent Application No. PA201670117, dated Jun. 13, 2016, 10 pages.
(Continued)

*Primary Examiner* — Andrey Belousov
(74) *Attorney, Agent, or Firm* — Dentons US LLP

(57) ABSTRACT

User interface navigation on a personal electronics device based on movements of a crown is disclosed. The device can select an appropriate level of information arranged along a (Continued)

z-axis for display based on crown movement. The navigation can be based on an angular velocity of the crown.

66 Claims, 28 Drawing Sheets

Related U.S. Application Data

(60) Provisional application No. 61/873,356, filed on Sep. 3, 2013, provisional application No. 61/959,851, filed on Sep. 3, 2013, provisional application No. 61/873,359, filed on Sep. 3, 2013, provisional application No. 61/873,360, filed on Sep. 3, 2013.

(51) Int. Cl.
*G06F 1/16* (2006.01)
*G06F 3/0482* (2013.01)

(58) Field of Classification Search
USPC .................................................. 715/841, 716
See application file for complete search history.

(56) References Cited

U.S. PATENT DOCUMENTS

| | | | |
|---|---|---|---|
| 6,570,583 B1 | 5/2003 | Kung et al. | |
| 6,636,246 B1* | 10/2003 | Gallo | G06F 3/04815 |
| | | | 715/746 |
| 6,661,438 B1 | 12/2003 | Shiraishi et al. | |
| 6,809,724 B1 | 10/2004 | Shiraishi et al. | |
| 7,600,192 B1* | 10/2009 | Hashimoto | G06F 3/0482 |
| | | | 715/716 |
| 8,046,705 B2* | 10/2011 | Hunleth | G06F 3/0482 |
| | | | 348/113 |
| 8,194,036 B1 | 6/2012 | Braun et al. | |
| 8,365,090 B2 | 1/2013 | Ording | |
| 8,427,432 B2 | 4/2013 | Kim et al. | |
| 9,052,814 B2 | 6/2015 | Ording | |
| 2003/0020671 A1 | 1/2003 | Santoro et al. | |
| 2003/0098891 A1* | 5/2003 | Molander | G06F 3/0482 |
| | | | 715/841 |
| 2004/0073935 A1 | 4/2004 | Kang | |
| 2004/0130581 A1 | 7/2004 | Howard et al. | |
| 2004/0252119 A1 | 12/2004 | Hunleth et al. | |
| 2004/0264301 A1 | 12/2004 | Howard et al. | |
| 2005/0209051 A1 | 9/2005 | Santomassimo et al. | |
| 2006/0064716 A1 | 3/2006 | Sull et al. | |
| 2006/0143574 A1* | 6/2006 | Ito | G06F 3/04817 |
| | | | 715/800 |
| 2007/0031119 A1 | 2/2007 | Iwanaga | |
| 2007/0106949 A1* | 5/2007 | Narita | G06F 3/0482 |
| | | | 715/757 |
| 2007/0132733 A1 | 6/2007 | Ram | |
| 2007/0180379 A1 | 8/2007 | Osato | |
| 2007/0182999 A1 | 8/2007 | Anthony et al. | |
| 2007/0211042 A1 | 9/2007 | Kim et al. | |
| 2007/0236475 A1 | 10/2007 | Wherry | |
| 2007/0236479 A1 | 10/2007 | Wang et al. | |
| 2008/0052945 A1 | 3/2008 | Matas et al. | |
| 2008/0062127 A1 | 3/2008 | Brodersen et al. | |
| 2008/0066135 A1 | 3/2008 | Brodersen et al. | |
| 2008/0168404 A1 | 7/2008 | Ording | |
| 2008/0172634 A1 | 7/2008 | Choi et al. | |
| 2008/0186808 A1 | 8/2008 | Lee | |
| 2008/0279475 A1 | 11/2008 | Lee et al. | |
| 2009/0007019 A1 | 1/2009 | Kobayashi et al. | |
| 2009/0098912 A1 | 4/2009 | Kim et al. | |
| 2009/0193359 A1 | 7/2009 | Anthony et al. | |
| 2009/0199130 A1 | 8/2009 | Tsern et al. | |
| 2009/0204920 A1 | 8/2009 | Beverley et al. | |
| 2009/0241150 A1* | 9/2009 | White | G06Q 30/00 |
| | | | 725/91 |
| 2010/0029327 A1 | 2/2010 | Jee | |
| 2010/0199232 A1 | 8/2010 | Mistry et al. | |
| 2010/0235742 A1 | 9/2010 | Hsu et al. | |
| 2010/0267424 A1 | 10/2010 | Kim et al. | |
| 2011/0014956 A1 | 1/2011 | Lee et al. | |
| 2011/0025624 A1 | 2/2011 | Goto | |
| 2011/0126155 A1 | 5/2011 | Krishnaraj et al. | |
| 2011/0164042 A1 | 7/2011 | Chaudhri | |
| 2011/0202866 A1 | 8/2011 | Huang et al. | |
| 2011/0316888 A1* | 12/2011 | Sachs | G06F 1/1626 |
| | | | 345/667 |
| 2012/0030627 A1 | 2/2012 | Nurmi et al. | |
| 2012/0032988 A1 | 2/2012 | Katayama | |
| 2012/0159380 A1 | 6/2012 | Kocienda et al. | |
| 2012/0192110 A1 | 7/2012 | Wu | |
| 2012/0327006 A1 | 12/2012 | Israr et al. | |
| 2013/0024811 A1 | 1/2013 | Gleadall et al. | |
| 2013/0073932 A1 | 3/2013 | Migos et al. | |
| 2013/0097566 A1 | 4/2013 | Berglund | |
| 2013/0135228 A1 | 5/2013 | Won et al. | |
| 2013/0135234 A1 | 5/2013 | Hisano et al. | |
| 2013/0142016 A1 | 6/2013 | Pozzo Di Borgo et al. | |
| 2013/0147747 A1 | 6/2013 | Takagi | |
| 2013/0154933 A1 | 6/2013 | Sheik-Nainar | |
| 2013/0208013 A1 | 8/2013 | Yuu et al. | |
| 2013/0226444 A1 | 8/2013 | Johansson et al. | |
| 2013/0262564 A1 | 10/2013 | Wall et al. | |
| 2013/0342457 A1 | 12/2013 | Cox et al. | |
| 2014/0028554 A1 | 1/2014 | De Los Reyes et al. | |
| 2014/0075368 A1 | 3/2014 | Kim et al. | |
| 2014/0143737 A1 | 5/2014 | Mistry et al. | |
| 2014/0160078 A1 | 6/2014 | Seo et al. | |
| 2014/0328147 A1 | 11/2014 | Yang et al. | |
| 2015/0085621 A1 | 3/2015 | Hong et al. | |
| 2015/0121224 A1 | 4/2015 | Krasnahill, Jr. | |
| 2015/0199110 A1 | 7/2015 | Nakazato | |
| 2015/0234518 A1 | 8/2015 | Teller et al. | |
| 2016/0011758 A1 | 1/2016 | Dornbush et al. | |
| 2016/0062571 A1 | 3/2016 | Dascola et al. | |
| 2016/0062573 A1 | 3/2016 | Dascola et al. | |
| 2016/0202866 A1 | 7/2016 | Zambetti et al. | |
| 2017/0010678 A1 | 1/2017 | Tuli | |
| 2017/0208466 A1 | 7/2017 | Seo et al. | |

FOREIGN PATENT DOCUMENTS

| | | |
|---|---|---|
| CN | 101893992 A | 11/2010 |
| CN | 103782252 A | 5/2014 |
| EP | 1406158 A2 | 4/2004 |
| EP | 1944677 A2 | 7/2008 |
| EP | 2551784 A1 | 1/2013 |
| EP | 2610738 A2 | 7/2013 |
| EP | 2741176 A2 | 6/2014 |
| GB | 2489580 A | 10/2012 |
| JP | 2001-202178 A | 7/2001 |
| JP | 2004-21522 A | 1/2004 |
| JP | 2006-140990 A | 6/2006 |
| JP | 2006-185273 A | 7/2006 |
| JP | 2007-170995 A | 7/2007 |
| JP | 2007-179544 A | 7/2007 |
| JP | 2012-058979 A | 3/2012 |
| JP | 2012-155698 A | 8/2012 |
| JP | 2013-137750 A | 7/2013 |
| KR | 10-2010-0003589 A | 1/2010 |
| KR | 10-2010-0109277 A | 10/2010 |
| KR | 10-2011-0093090 A | 8/2011 |
| KR | 10-2012-0079707 A | 7/2012 |
| TW | 201119339 A1 | 6/2011 |
| TW | 1405106 B | 8/2013 |
| WO | 2006/037545 A2 | 4/2006 |

OTHER PUBLICATIONS

Office Action received for Taiwan Patent Application No. 103130517, dated Feb. 22, 2016, 7 pages (3 pages of English Translation and 4 pages of Official Copy).

Danish Search Report received for Denmark Patent Application No. PA201570781, dated Mar. 8, 2016, 10 pages.

(56) References Cited

OTHER PUBLICATIONS

NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Office Action received for Danish Patent Application No. PA201570776, dated Jan. 26, 2016, 12 pages.
International Preliminary Report on Patentability received for PCT Patent Application No. PCT/US2014/053957, dated Mar. 17, 2016, 8 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2015/047704, dated Feb. 22, 2016, 25 pages.
Invitation to Pay Additional Fees received for PCT Patent Application No. PCT/US2015/047704, dated Dec. 16, 2015, 10 pages.
Office Action received for Danish Patent Application No. PA201570776, dated Aug. 19, 2016, 3 pages.
Office Action received for Danish Patent Application No. PA201570781, dated Aug. 19, 2016, 3 pages.
Office Action received for Taiwanese Patent Application No. 103130517, dated Jul. 29, 2016, 7 pages (3 pages of English Translation and 4 pages of Official Copy).
Office Action received for Taiwanese Patent Application No. 104128701, dated Jul. 22, 2016, 25 pages (9 pages of English Translation and 16 pages of Official Copy).
Office Action received for Taiwanese Patent Application No. 104128701, dated Mar. 16, 2017, 8 pages (3 pages of English Translation and 5 pages of Official Copy).
International Preliminary Report on Patentability received for PCT Patent Application No. PCT/US2015/047704, dated Mar. 16, 2017, 19 pages.
Notice of Allowance received for Danish Patent Application No. PA201570776, dated Feb. 8, 2017, 2 pages.
Office Action received for Japanese Patent Application No. 2016-537946, dated Jan. 30, 2017, 12 pages. (6 pages of English Translation and 6 pages of Official Copy).
Intention to Grant received for Danish Patent Application No. PA201570776, dated Dec. 8, 2016, 2 pages.
Intention to Grant received for Danish Patent Application No. PA201570781, dated Dec. 8, 2016, 2 pages.
Office Action received for Danish Patent Application No. PA201670117, dated Jan. 12, 2017, 3 pages.
Office Action received for Korean Patent Application No. 10-2016-7008449, dated Jan. 12, 2017, 15 pages (6 pages of English translation and 9 pages of official Copy).
Office Action received for Australian Patent Application No. 2014315324, dated Oct. 21, 2016, 3 pages.
Intention to Grant received for Danish Patent Application No. PA201670117, dated Apr. 21, 2017, 2 pages.
Office Action received for European Patent Application No. 14772001.5, dated May 30, 2017, 10 pages.
Non-Final Office Action received for U.S. Appl. No. 14/839,912, dated Feb. 12, 2018, 30 pages.
Office Action received for Korean Patent Application No. 10-2016-7008449, dated Jan. 16, 2018, 10 pages (5 pages of English Translation and 5 pages of Official Copy).
Office Action received for Danish Patent Application No. PA201770794, dated Dec. 19, 2017, 8 pages.
Decision to Grant received for Danish Patent Application No. PA201670117, dated Nov. 20, 2017, 2 pages.
Office Action received for Korean Patent Application No. 10-2016-7008449, dated Nov. 27, 2017, 6 pages (3 pages of English Translation and 3 pages of Official Copy).
Non-Final Office Action received for U.S. Appl. No. 14/913,349, dated Jan. 11, 2018, 6 pages.
Agarwal, Deepesh, "DexClock—Live Clock and Date Blended Into Beautiful Artwork as Your Desktop Wallpaper", Megaleecher.Net, Jul. 6, 2013, 4 pages.
Non-Final Office Action received for U.S. Appl. No. 14/839,914, dated Oct. 19, 2017, 46 pages.
Notice of Acceptance received for Australian Patent Application No. 2014315324, dated Sep. 28, 2017, 3 pages.
The Window Club, "How to Set GIF as Background Windows 7", Online Available at <https://www.youtube.com/watch?v=tUec42Qd7ng>, Dec. 24, 2012, 5 pages.
Decision to Grant received for Danish Patent Application No. PA201570781, dated Jul. 17, 2017, 2 pages.
Office Action received for Australian Patent Application No. 2014315324, dated Aug. 8, 2017, 3 pages.
Office Action received for Japanese Patent Application No. 2016-537946, dated Aug. 7, 2017, 8 pages (4 Pages of English Translation and 4 Pages of Official Copy).
Office Action received for U.S. Appl. No. 14/839,912, dated Jun. 8, 2017, 26 pages.
Notice of Allowance received for Japanese Patent Application No. 2016-537946, dated Mar. 26, 2018, 4 pages (1 page of English Translation and 3 pages of Official Copy).
Office Action received for Chinese Patent Application No. 201480060044.1, dated Jan. 26, 2018, 15 pages (5 pages of English translation and 10 pages of Official Copy).
Office Action received for Taiwanese Patent Application No. 103130517, dated Feb. 6, 2018, 5 pages (2 pages of English Translation and 3 pages of Official Copy).
Notice of Allowance received for Taiwanese Patent Application No. 103130517, dated May 14, 2018, 5 pages (2 pages of English Translation and 3 pages of Official Copy).
Office Action received for Korean Patent Application No. 10-2018-7010872, dated May 21, 2018, 10 pages (4 pages of English Translation and 6 pages of Official Copy).
Notice of Allowance received for U.S. Appl. No. 14/839,914, dated Jun. 22, 2018, 12 pages.
Final Office Action received for U.S. Appl. No. 14/913,349, dated Jul. 30, 2018, 18 pages.
Office Action received for Australian Patent Application No. 2017276285, dated Nov. 26, 2018, 2 pages.
Summons to Attend Oral Proceedings received for European Patent Application No. 14772001.5, mailed on Nov. 14, 2018, 5 pages.
Office Action received for European Patent Application No. 14772001.5, dated Feb. 14, 2018, 5 pages.
Summons to Attend Oral Proceedings received for European Patent Application No. 14772001.5, mailed on Oct. 4, 2018, 15 pages.
Office Action received for Danish Patent Application No. PA201770794, dated Oct. 30, 2018, 3 pages.
Office Action received for Chinese Patent Application No. 201480060044.1, dated Sep. 25, 2018, 6 pages (3 pages of English translation and 3 pages of official copy).
Office Action received for Danish Patent Application No. PA201770794, dated Apr. 5, 2018, 4 pages.
Intention to Grant received for Danish Patent Application No. PA201770794, dated Aug. 15, 2019, 2 pages.
Notice of Allowance received for Korean Patent Application No. 10-2016-7008449, dated Aug. 9, 2019, 6 pages (2 pages of English Translation and 4 pages of Official Copy).
Decision to Grant received for Danish Patent Application No. PA201770794, dated Nov. 11, 2019, 2 pages.
European Search Report received for European Patent Application No. 19199004.3, dated Nov. 12, 2019, 6 pages.
Office Action received for Korean Patent Application No. 10-2019-7007748, dated Nov. 15, 2019, 9 pages (3 pages of English Translation and 6 pages of Official Copy).

* cited by examiner

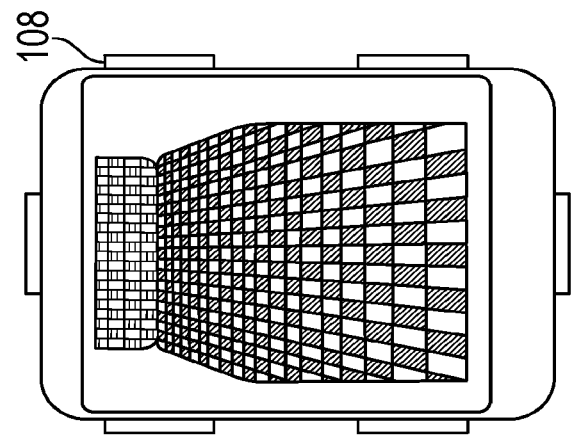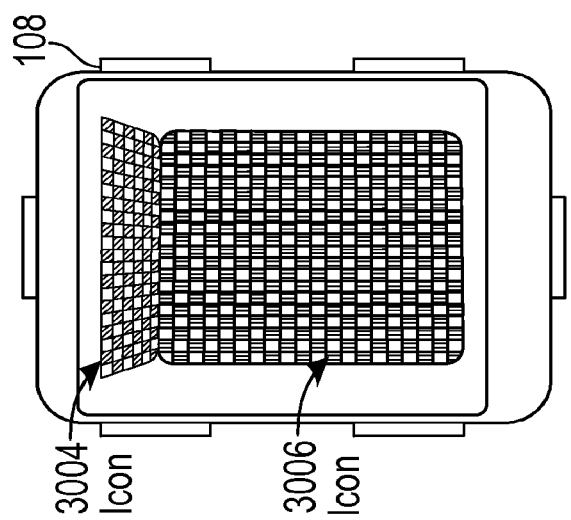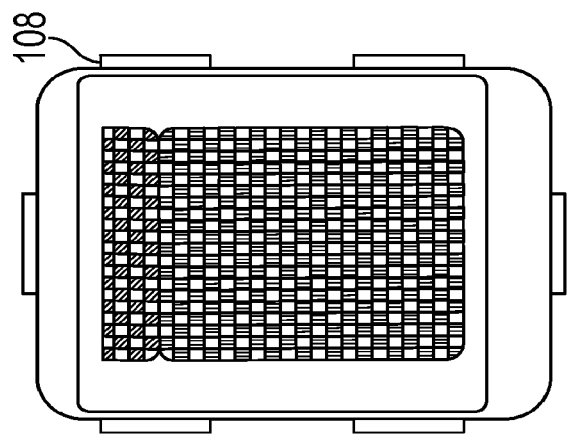
FIG. 30

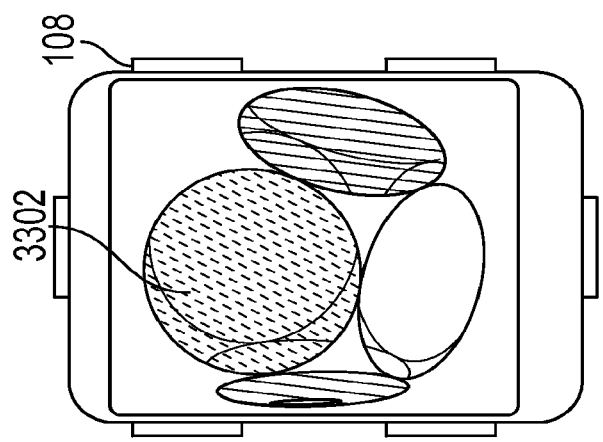
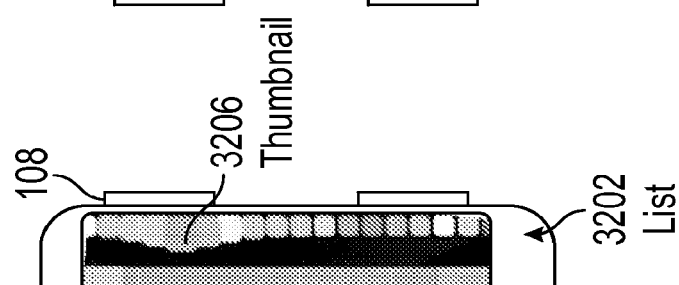
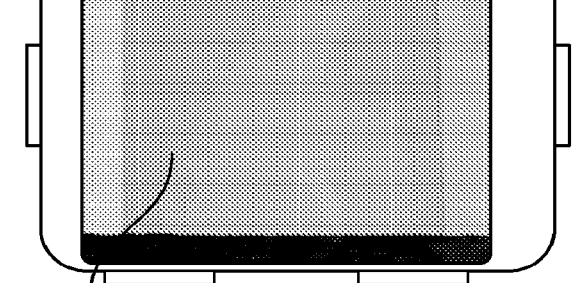
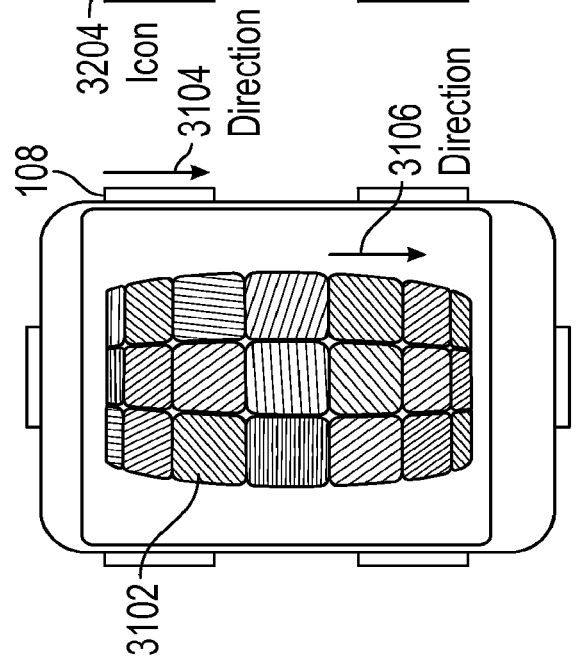
FIG. 33
FIG. 32
FIG. 31

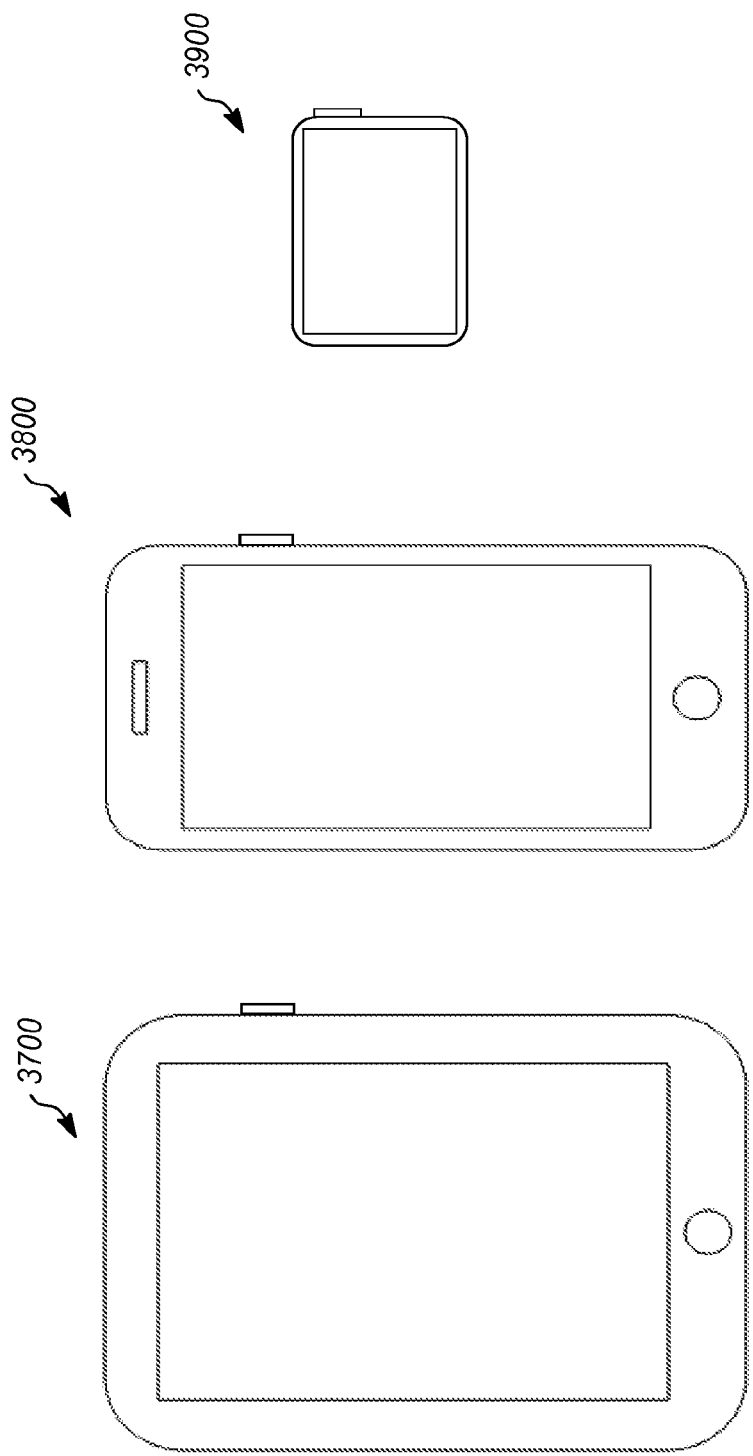

USER INTERFACE FOR MANIPULATING USER INTERFACE OBJECTS

CROSS-REFERENCE TO RELATED APPLICATIONS

This application is a continuation of U.S. patent application Ser. No. 14/913,349, filed Feb. 19, 2016, entitled "USER INTERFACE FOR MANIPULATING USER INTERFACE OBJECTS", which is a national stage application of International Patent Application No. PCT/US2014/053957, filed Sep. 3, 2014, entitled "USER INTERFACE FOR MANIPULATING USER INTERFACE OBJECTS", which claims the benefit of priority of U.S. Provisional Patent Application Ser. No. 61/873,356, filed Sep. 3, 2013, entitled "CROWN INPUT FOR A WEARABLE ELECTRONIC DEVICE"; U.S. Provisional Patent Application Ser. No. 61/873,359, filed Sep. 3, 2013, entitled "USER INTERFACE OBJECT MANIPULATIONS IN A USER INTERFACE"; U.S. Provisional Patent Application Ser. No. 61/959,851, filed Sep. 3, 2013, entitled "USER INTERFACE FOR MANIPULATING USER INTERFACE OBJECTS"; U.S. Provisional Patent Application Ser. No. 61/873,360, filed Sep. 3, 2013, entitled "USER INTERFACE FOR MANIPULATING USER INTERFACE OBJECTS WITH MAGNETIC PROPERTIES". International Patent Application No. PCT/US2014/053957, filed Sep. 3, 2014, entitled "USER INTERFACE FOR MANIPULATING USER INTERFACE OBJECTS", is also a continuation-in-part of U.S. Non-provisional patent application Ser. No. 14/476,657, filed Sep. 3, 2014, entitled "USER INTERFACE FOR MANIPULATING USER INTERFACE OBJECTS WITH MAGNETIC PROPERTIES". The content of these applications is hereby incorporated by reference in its entirety for all purposes.

This application is related to International Patent Application Serial No. PCT/US2014/053961, filed Sep. 3, 2014, entitled "USER INTERFACE FOR MANIPULATING USER INTERFACE OBJECTS WITH MAGNETIC PROPERTIES"; International Patent Application Serial Number PCT/US2014/053951, filed Sep. 3, 2014, entitled "CROWN INPUT FOR A WEARABLE ELECTRONIC DEVICE"; and International Patent Application Serial Number PCT/US2014/053958 filed Sep. 3, 2014, entitled "USER INTERFACE OBJECT MANIPULATIONS IN A USER INTERFACE" The content of these applications is hereby incorporated by reference in its entirety for all purposes.

FIELD

The disclosed embodiments relate generally to user interfaces of electronic devices, including but not limited to user interfaces for electronic watches.

BACKGROUND

Advanced personal electronic devices can have small form factors. Exemplary personal electronic devices include but are not limited to tablets and smart phones. Uses of such personal electronic devices involve manipulation of user interface objects on display screens which also have small form factors that complement the design of the personal electronic devices.

Exemplary manipulations that users can perform on personal electronic devices include navigating a hierarchy, selecting a user interface object, adjusting the position, size, and zoom of user interface objects, or otherwise manipulating user interfaces. Exemplary user interface objects include digital images, video, text, icons, control elements such as buttons, and other graphics.

Existing methods for manipulating user interface objects on reduced-size personal electronic devices can be inefficient. Further, existing methods generally provide less precision than is preferable.

SUMMARY

In some embodiments, techniques for navigating a user interface on a personal electronics device based on movements of a crown are disclosed. Systems and computer-readable storage media for performing the processes described above are also disclosed.

BRIEF DESCRIPTION OF THE DRAWINGS

FIG. 30 illustrates an exemplary user interface and transition.
FIG. 31 illustrates an exemplary user interface.
FIG. 32 illustrates an exemplary user interface.
FIG. 33 illustrates an exemplary user interface.
FIG. 37 illustrates an exemplary personal electronic device.
FIG. 38 illustrates an exemplary personal electronic device.
FIG. 39 illustrates an exemplary personal electronic device.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

Figure 1:
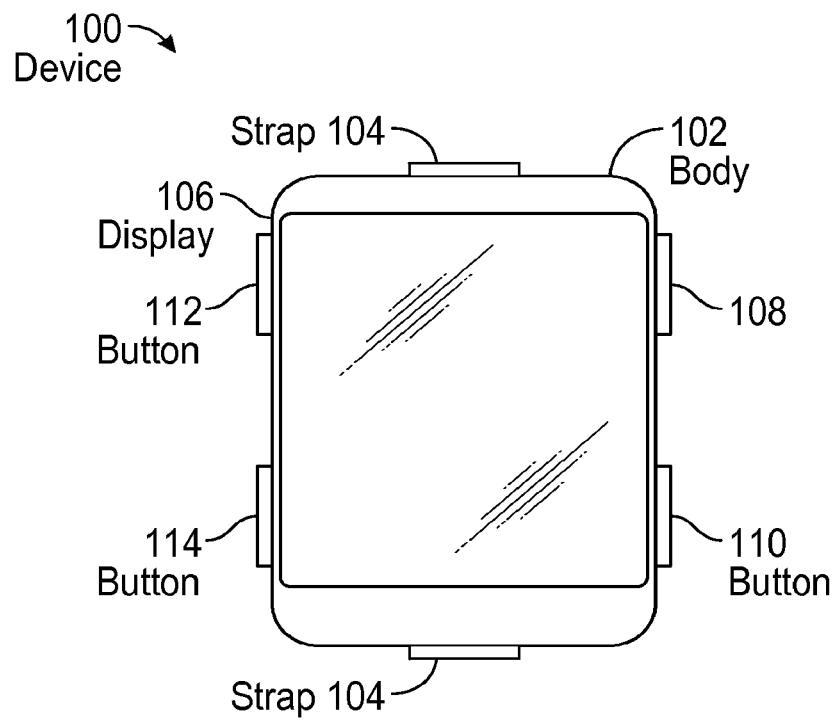
FIG. 1 illustrates an exemplary personal electronic device.

FIG. 1 illustrates exemplary personal electronic device 100. In the illustrated example, device 100 is a watch that generally includes body 102 and strap 104 for affixing device 100 to the body of a user. That is, device 100 is wearable. Body 102 can designed to couple with straps 104. Device 100 can have touch-sensitive display screen (hereafter touchscreen) 106 and crown 108. In some embodiments, device 100 can have one or more buttons 110, 112, and 114. In some embodiments, device 100 does not have buttons 110, 112, nor 114.

Conventionally, the term "crown," in the context of a watch, refers to the cap atop a stem for winding the watch. In the context of a personal electronic device, the crown can be a physical component of the electronic device, rather than a virtual crown on a touch sensitive display. Crown 108 can be mechanical meaning that it can be connected to a sensor for converting physical movement of the crown into electrical signals. Crown 108 can rotate in two directions of rotation (e.g., forward and backward). Crown 108 can also be pushed in towards the body of device 100 and/or be pulled away from device 100. Crown 108 can be touch-sensitive, for example, using capacitive touch technologies that can detect whether a user is touching the crown. Moreover, crown 108 can further be rocked in one or more directions or translated along a track along an edge or at least partially around a perimeter of body 102. In some examples, more than one crown 108 can be used. The visual appearance of crown 108 can, but need not, resemble crowns of conventional watches. There examples described herein refer to crown rotations, pushes, pulls, and/or touches, each of which constitutes a physical state of the crown.

Buttons 110, 112, and 114, if included, can each be a physical or a touch-sensitive button. That is, the buttons may be, for example, physical buttons or capacitive buttons. Further, body 102, which can include a bezel, may have predetermined regions on the bezel that act as buttons.

Touchscreen 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Touchscreen 106 can allow a user to perform various functions by touching over hovering near the touch sensor panel using one or more fingers or other object.

In some examples, device 100 can further include one or more pressure sensors (not shown) for detecting a force or pressure applied to the display. The force or pressure applied to touchscreen 106 can be used as an input to device 100 to perform any desired operation, such as making a selection, entering or exiting a menu, causing the display of additional options/actions, or the like. In some examples, different operations can be performed based on the amount of force or pressure being applied to touchscreen 106. The one or more pressure sensors can further be used to determine a position that the force is being applied to touchscreen 106.

1. Crown-Based User Interface Control

Figure 2:
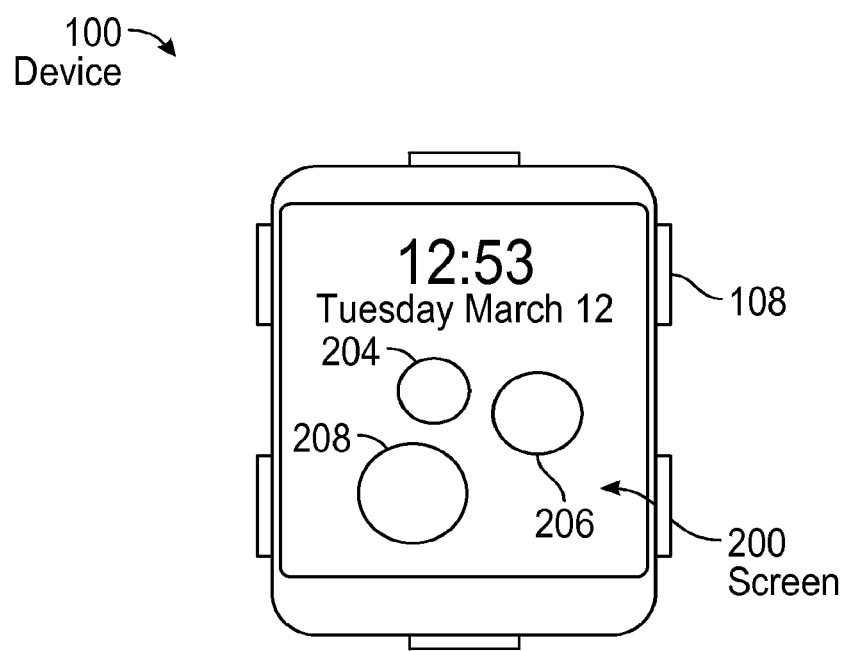
FIG. 2 illustrates an exemplary user interface.

FIGS. 2-7 illustrate exemplary user interfaces that respond to movements of crown 108 (FIG. 1). FIG. 2 shows exemplary screen 200 that can be displayed by device 100. Screen 200 can be, for example, a home screen that appears upon power-on of device 100 or that appears initially when the touchscreen display of device 100 powers-on (including wake up from a sleep state). Icons 204, 206, and 208 can be displayed in screen 200. In some embodiments, the icons can correspond to applications operable on device 100, meaning that the applications can be installed onto and/or can execute as a service on device 100. A touch (e.g., a finger tap) on an icon causes the corresponding application to launch, meaning that the application runs in the foreground of device 100 and appears on touchscreen 106. In some embodiments, the icons can correspond to text documents, media items, web pages, e-mail messages, or the like.

Device 100 can select icons 204, 206, and 208 out of larger set of available icons for display on screen 200 because these icons have information relevant to the user at the current time. For example, icon 204 can correspond to a messaging application in which the user has just received an incoming message, and icon 206 can correspond to a calendar application where the user has an upcoming calendar appointment entry.

Figure 3:
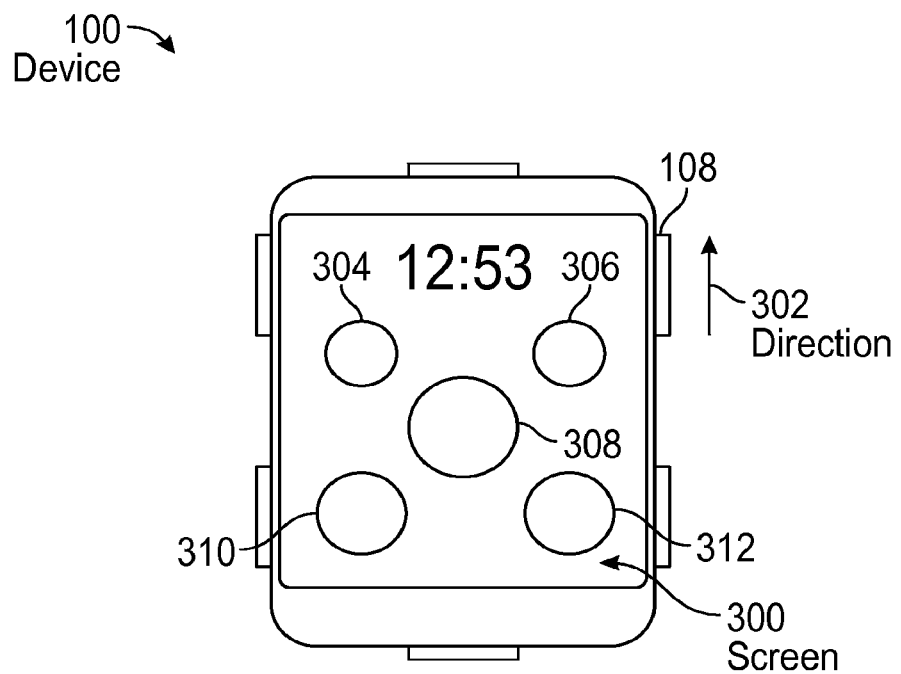
FIG. 3 illustrates an exemplary user interface.

FIG. 3 shows exemplary screen 300, which can be displayed by device 100 in response to a rotation of crown 108 in direction 302 while screen 200 (FIG. 2) is displayed. Screen 300 can show, for example, a user's favorite icons, selected previously by the user from a larger set of available icons. Also, screen 300 can include icons, selected from the larger set of available icons, by device 100 based on a user's frequency of access of the icons. Exemplary icons 304, 306, 308, 310, and 312 displayed in screen 300 can each correspond to an application operable on device 100. A touch (e.g., a finger tap) on an icon causes the corresponding application to launch.

Figure 4:
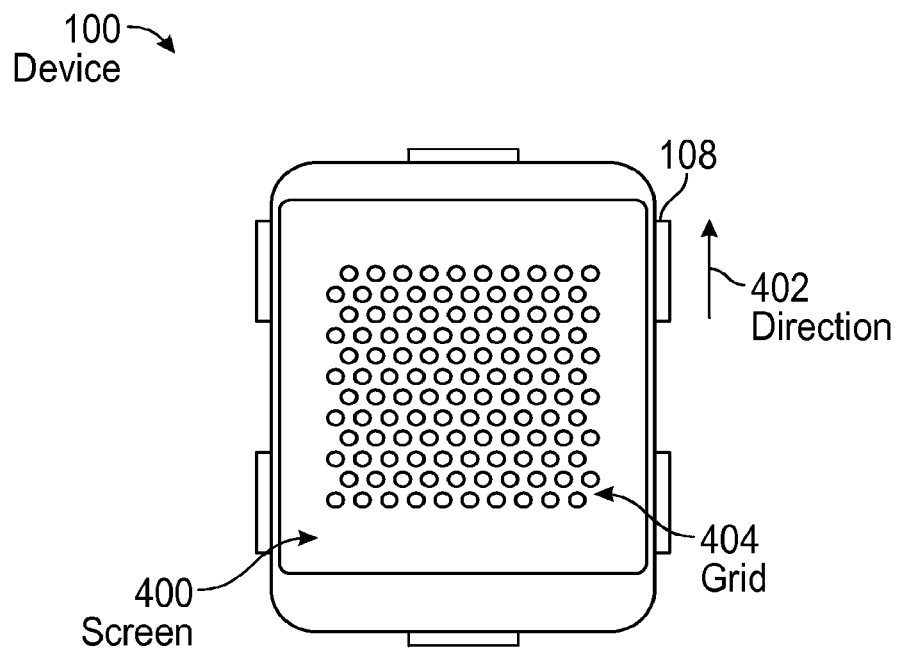
FIG. 4 illustrates an exemplary user interface.

FIG. 4 shows exemplary screen 400, which can be displayed by device 100 in response to a rotation of crown 108 in direction 402 while screen 300 (FIG. 3) is displayed. Screen 400 can show, for example, icons corresponding to all of the applications operable on device 100. Because a large number of applications can be operable on device 100, screen 400 can include a large number of icons. When many icons are displayed, the icons can be sized accordingly so that they can fit within touchscreen 106, or sized so that at least a representative number or predetermined percentage of icons can fit visibly within touchscreen 106.

Figure 5:
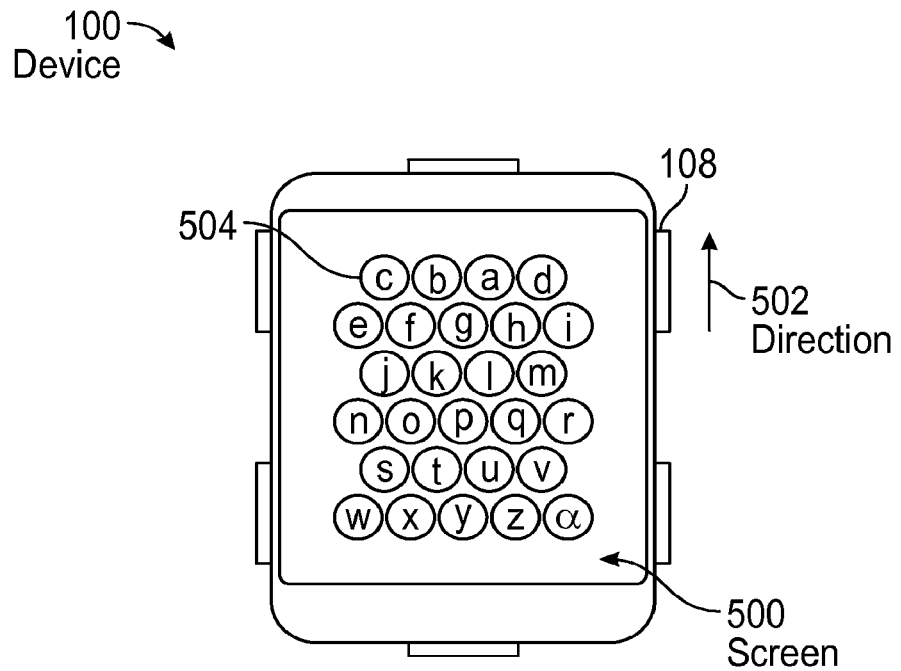
FIG. 5 illustrates an exemplary user interface.

FIG. 5 shows exemplary screen 500, which can be displayed by device 100 in response to a rotation of crown 108 in direction 502 while screen 400 (FIG. 4) is displayed. Screen 500 can show, for example, icons corresponding to a subset of the applications operable on device 100. Because fewer icons are displayed on screen 500 as compared with screen 400, the icons that are displayed on screen 500, e.g., icon 504, can become larger and can have additional fidelity as compared with the display of icons on screen 400. For example, icons on screen 500 can have indicia, in the form of text and/or imagery, identifying its corresponding application. As shown, icon 504 uses the letter "c" to suggest the name of the corresponding application begins with a "c", as in clock. In some embodiments, a touch (e.g., a finger tap) on an icon causes the corresponding application to launch.

Figure 6:
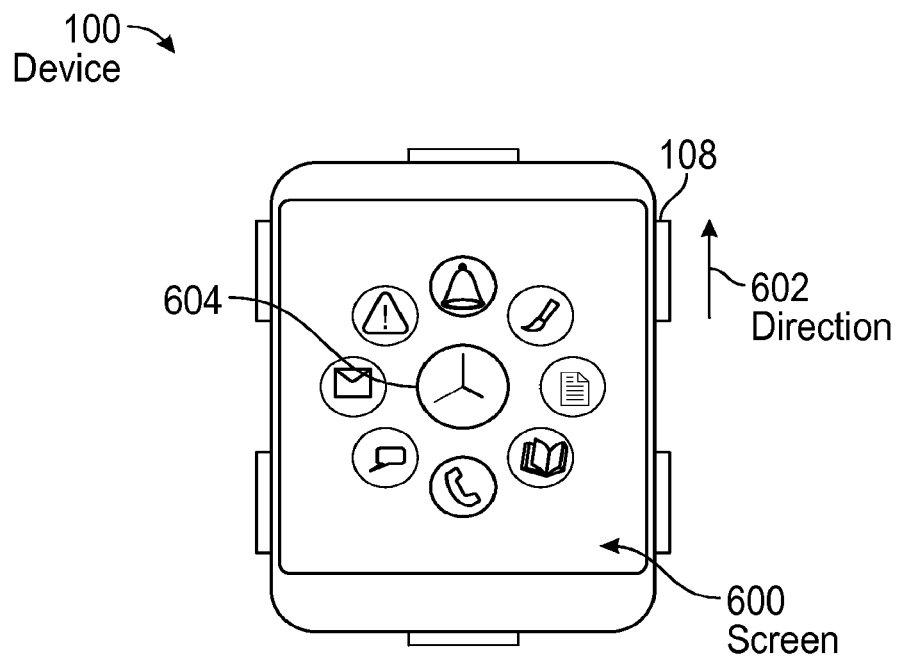
FIG. 6 illustrates an exemplary user interface.

FIG. 6 shows exemplary screen 600, which can be displayed by device 100 in response to a rotation of crown 108 in direction 602. Screen 600 can show, for example, a further winnowed subset of icons, as compared with screen 500, that correspond to applications operable on device 100. Because even fewer icons are displayed on screen 600 as compared with screen 500 (FIG. 5), the icons that are displayed (e.g., icon 604) can enlarge further and can have additional fidelity as compared with the display of icons on screens 200, 300, 400, and 500. For example, icon 604 can have the image of a clock that displays the current time. In some embodiments, a touch (e.g., a finger tap) on an icon causes the corresponding application to launch.

Figure 7:
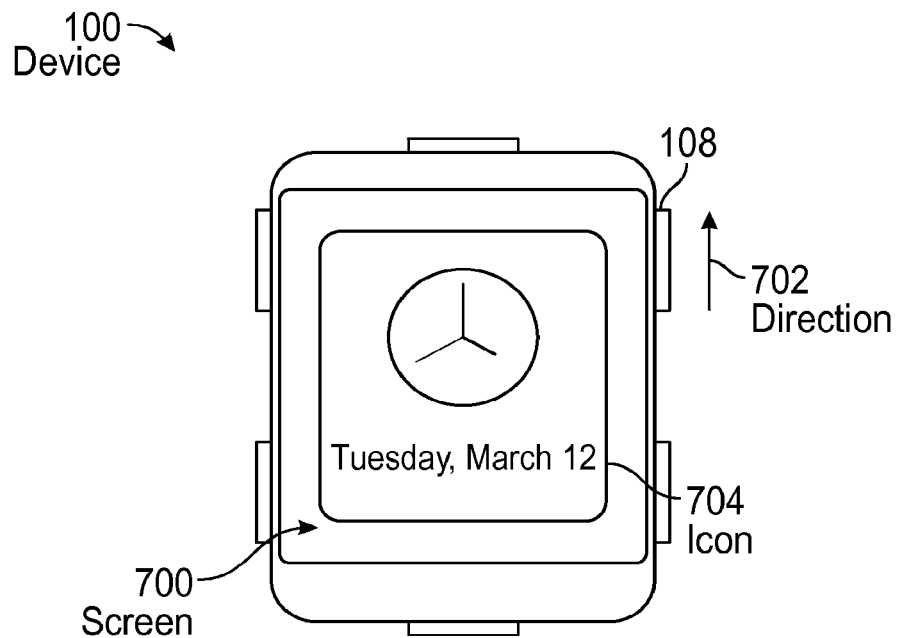
FIG. 7 illustrates an exemplary user interface.
Figure 8:
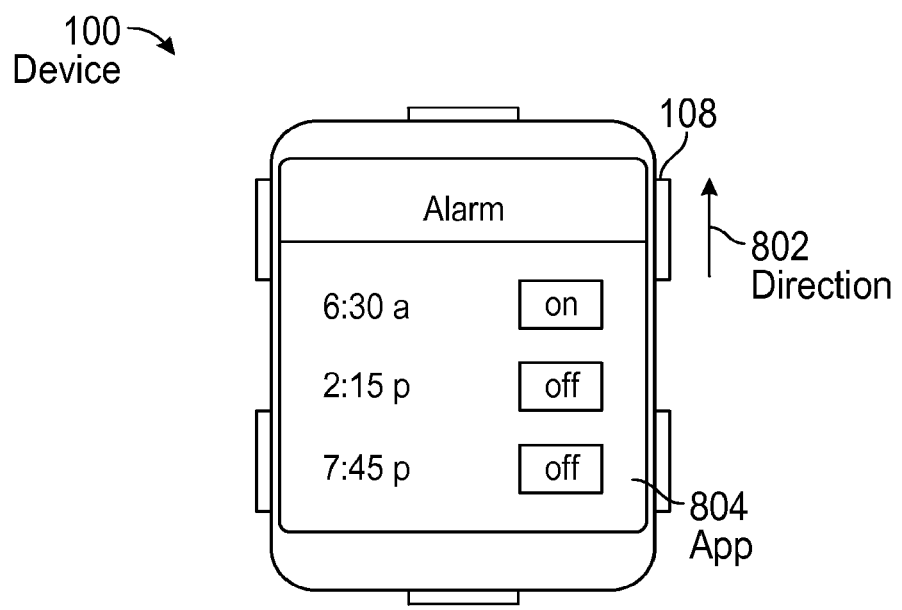
FIG. 8 illustrates an exemplary user interface.

FIGS. 7 and 8 show exemplary screens 700 and 800, respectively, that can be displayed by device 100 in response to a rotation of crown 108 in direction 702 while screen 600 (FIG. 6) is displayed.

With reference to FIG. 7, in some embodiments, screen 700 can be displayed in response to crown rotation in direction 702 when screen 600 (FIG. 6) is displayed. Because a single icon 704 is displayed on screen 700, icon 704 can have additional fidelity as compared with the previous screens. For example, icon 704 can have the image of a clock that displays day-date information along with the current time. A touch (e.g., a finger tap) on icon 704 causes the corresponding application to launch.

Turning to FIG. 8, in some embodiments, screen 800 can be displayed in response to crown rotation in direction 802 when screen 600 (FIG. 6) is displayed. Screen 800 shows application 804, which corresponds to icon 704 (FIG. 7), operating in the foreground of device 100. That is, application 804 launched in response to crown rotation in direction 802. Exemplary application 804 can be a clock application that provides alarm features. Also, in some embodiments, screen 800 becomes displayed in response to crown rotation in direction 802 when screen 700 FIG. 7) is displayed.

Screens 200-700 (FIGS. 2-7) described above can be logically organized as planes of information along an axis. Under this organization, a given screen of icons can be thought of as a plane, defined by two axes (e.g., x- and y-axes), having icons spatially positioned thereon. Multiple planes can be organized along a third axis orthogonal to at least one of the x- or y-axes, called the z-axis. (The z-axis can be perpendicular to the plane formed by the x- and y-axes.)

Figure 9:
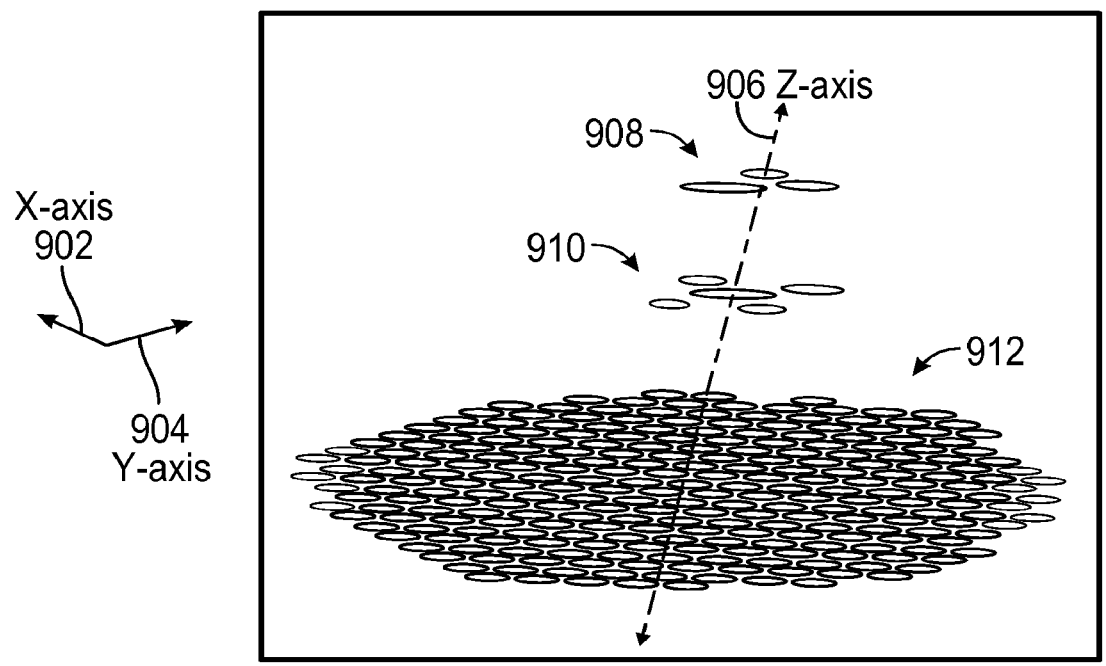
FIG. 9 illustrates an exemplary logical structure of a user interface.

This logical organization is illustrated by FIG. 9, in which x-axis 902 and y-axis 904 form a plane co-planar with the touchscreen screen surface of device 100 (FIG. 1) and z-axis 906 is perpendicular to the x/y-plane formed by axes 902 and 904. Plane 908 can correspond to screen 200 (FIG. 2). Plane 910 can correspond to screen 300 (FIG. 3). Plane 912 can represent the collection of icons that represent the operable applications of a personal electronic device. Thus, different viewpoints of plane 912 can correspond to screens 400-700 (FIGS. 4-7). Planes 908 and 910 can be related to plane 912 in that planes 908 and 910 can each include a subset of the icons available on plane 912. The particular plane of information (i.e., screen of icons) that is to be displayed on a personal electronic device can be selected via crown movement, such as crown rotation. That is, crown movement can be used to traverse the planes of information intersecting z-axis 906, or to provide alternative views of a given plane (e.g., plane 912).

In some embodiments, when an end of the z-axis (e.g., the top or bottom-most plane) is reached via crown movement, the displayed information (e.g., screen of icons) produces a rubberband effect to indicate that the end has been reached. Consider the situation in which a user has, through crown input, reached the bottom most plane of information. As the user provides additional crown input in the same direction, the displayed collection of icons shrink (to the extent possible) in accordance with the crown movement until the movement stops. When the crown movement stops, the displayed icons return from their shrunken size back to their normal size via on-screen animation, thereby producing the visual effect of rubberbanding.

One notable benefit of this logical organization is that different planes of information need not be (but can be) zoomed subsets of one another. That is, for example, planes 908 and 910 can contain entire different icons out of those icons available on a personal electronic device, but yet the different planes of information can be accessed efficiently by a user.

Alternatively, screens 200-700 (FIG. 2-7) can be logically organized as subsets of information belonging to different modal states of a personal electronic device. Under this organization, screens 200 and 300 can correspond to first and a second modal state of the device, and screens 400-700 can correspond to a third modal state, for example. The personal electronic device can cycle through modal states in response to crown pushes, and can display screens 200 or 300 in the first and second modal states, respectively. In alternative embodiments, modal states may be cycled using buttons 110, 112, or 114. When multiple screens are available within a particular modal state (e.g., the third modal state), the device can switch from the display of one screen (e.g., 300) to another screen (e.g., 400) based on crown rotation. On-screen user interface elements, such as paging dots, can be used to indicate the availability of additional screens for display within a particular modal state.

Figure 41:
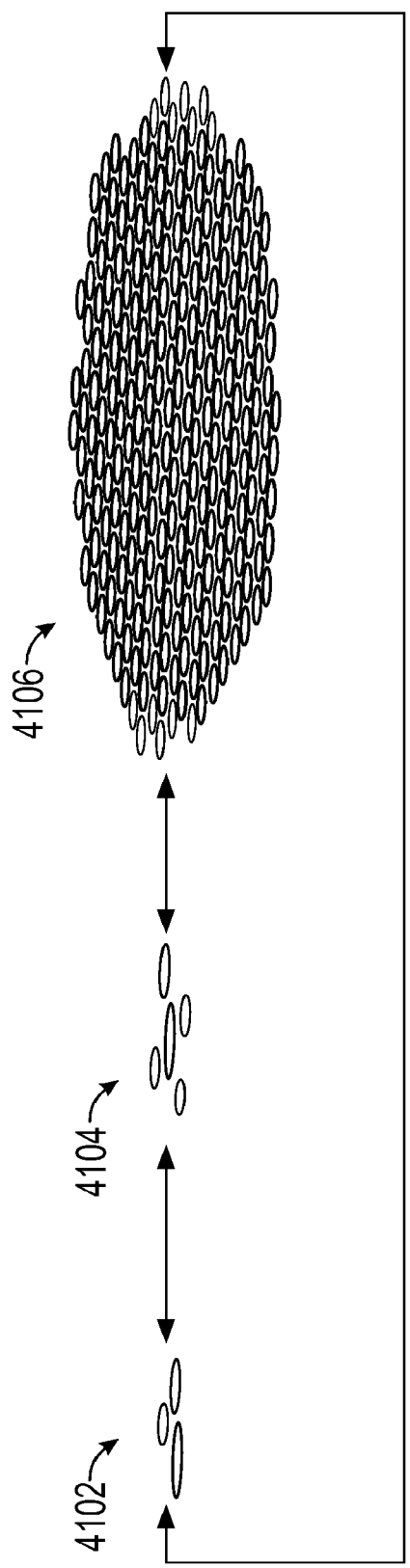
FIG. 41 illustrates an exemplary logical structure of a user interface.

This logical arrangement is illustrated by FIG. 41. As shown, planes 4102 and 4104 can correspond to screens 200 (FIG. 2) and 300 (FIG. 3) respectively. Plane 4106 can represent the collection of icons that represent the operable applications of a personal electronic device. Thus, different viewpoints of plane 4106 can correspond to screens 400-700 (FIGS. 4-7). The particular plane of information (i.e., screen of icons) that is to be displayed on a personal electronic device can be selected via crown movement, such as crown pushes.

2. Velocity-Based Crown Control

Device 100 (FIG. 1) can consider the angular velocity of rotation of crown 108 (FIG. 1) in determining whether one screen of icons should be replaced with another screen of icons. Specifically, device 100 can require crown 108 to rotate above a predetermined angular velocity before changing the display of one screen of icons to another. In this way, while slow rotations of crown 108 that are unintended by a user can still cause device 100 to receive crown input indicating angular displacement, the displacement need not be interpreted as having sufficient velocity to cause user interface updates that are unintended. The selection of predetermined angular velocities for this purpose can depend on a number of factors, such as the density of icons currently displayed, the visual arrangement of icons currently displayed, and so forth.

In some embodiments, the minimum angular velocity of crown rotation that is necessary to switch between screens of icons corresponds directly to the instantaneous angular velocity of crown 108 (FIG. 1), meaning that the user interface of device 100, in essence, responds when crown 108 reaches a sufficient angular velocity. In some embodiments, the minimum angular velocity of crown rotation necessary for switching between screens of icons is a calculated velocity that is based on, but not directly equal to, the instantaneous ("current") angular velocity of crown 108. In these embodiments, device 100 can maintain a calculated crown (angular) velocity V in discrete moments in time T according to equation 1:

$$V_T = V_{(T-1)} + \Delta V_{CROWN} - \Delta V_{DRAG}. \quad (EQ. 1)$$

In equation 1, $V_T$ represents a calculated crown velocity (speed and direction) at time T, $V_{(T-1)}$ represents the previous velocity (speed and direction) at time T−1, $\Delta V_{CROWN}$ represents the change in velocity caused by the force being applied through the rotation of the crown at time T, and $\Delta V_{DRAG}$ represents the change in velocity due to a drag force. The force being applied, which is reflected through $\Delta V_{CROWN}$, can depend on the current velocity of angular rotation of the crown. Thus, $\Delta V_{CROWN}$ can also depend on the current angular velocity of the crown. In this way, device 100 can provide user interface interactions based not only on instantaneous crown velocity but also based on user input in the form of crown movement over multiple time intervals, even if those intervals are finely divided. Note, typically, in the absence of user input in the form of $\Delta V_{CROWN}$, $V_T$ will approach (and become) zero based on $\Delta V_{DRAG}$ in accordance with EQ. 1, but $V_T$ would not change signs without user input in the form of crown rotation ($\Delta V_{CROWN}$).

Typically, the greater the velocity of angular rotation of the crown, the greater the value of $\Delta V_{CROWN}$ will be. However, the actual mapping between the velocity of angular rotation of the crown and $\Delta V_{CROWN}$ can be varied depending on the desired user interface effect. For example, various linear or non-linear mappings between the velocity of angular rotation of the crown and $\Delta V_{CROWN}$ can be used. In another example, the mapping can depend on the number of icons and/or icon arrangement currently being displayed.

Also, $\Delta V_{DRAG}$ can take on various values. For example, $\Delta V_{DRAG}$ can depend on the velocity of crown rotation such that at greater velocities, a greater opposing change in velocity ($\Delta V_{DRAG}$) can be produced. In another example, $\Delta V_{DRAG}$ can have a constant value. In yet another example, $\Delta V_{DRAG}$ can be based on the number of current displayed icons and/or the currently displayed icon arrangement. It should be appreciated that the above-described requirements of $\Delta V_{CROWN}$ and $\Delta V_{DRAG}$ can be changed to produce desirable user interface effects.

As can be seen from EQ. 1, the maintained velocity ($V_T$) can continue to increase as long as $\Delta V_{CROWN}$ is greater than $\Delta V_{DRAG}$. Additionally, $V_T$ can have non-zero values even when no $\Delta V_{CROWN}$ input is being received, meaning that user interface screens can continue to change without the user rotating the crown. When this occurs, screens can stop changing based on the maintained velocity at the time the user stops rotating the crown and the $\Delta V_{DRAG}$ component.

In some embodiments, when the crown is rotated in a direction corresponding to a rotation direction that is opposite the current user interface changes, the $V_{(T-1)}$ component can be reset to a value of zero, allowing the user to quickly change the direction of the screen changes without having to provide a force sufficient to offset the $V_T$.

In other embodiments, different physical crown states other than rotation of the crown are used to navigate through displayed icons.

3. User Interface Appearance

Figure 10:
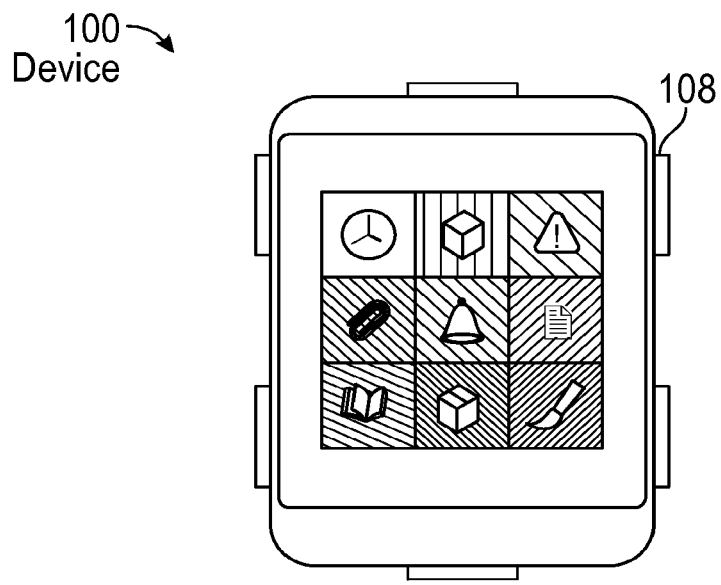
FIG. 10 illustrates an exemplary user interface.

Icons can take on various visual appearances. For example, icons can be rectangular in shape, as shown in FIG. 10. As another example, icons can be circular, as shown in FIGS. 2-7. Further, icons can take on various spatial arrangement schemes, meaning that icons can be arranged along the rows and columns of an invisible grid. Grids can be symmetrical or non-symmetrical. In FIG. 10, a symmetrical grid is used, for example. In FIG. 5, a non-symmetrical grid having x icons arranged on a first row and y icons arranged along a second row is used, for example.

Figure 11:
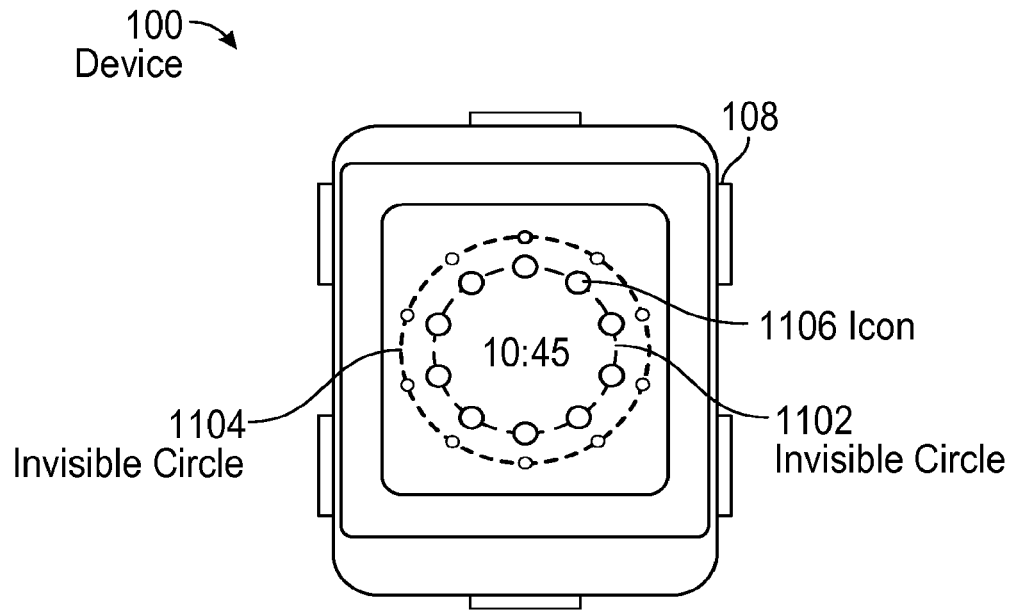
FIG. 11 illustrates an exemplary user interface.

FIG. 11 illustrates a radial icon arrangement scheme where circular icons are aligned along the circumference of invisible circles 1102 and 1104 of different diameters. Invisible circles 1102 and 1104 are, but need not be, concentric. Icons, such as icon 1106, arranged along different invisible circles can have different sizes. As shown, icons arranged along invisible circle 1102 are closer to the center of device 100 and are larger than those arranged along invisible circle 1104. Also, although not illustrated in FIG. 11, icons in a radial arrangement can be arranged along more than two invisible circles.

The distance that a particular icon is position from the center of the radial icon arrangement can depend on different factors. For example, the distance can be proportional to frequency of use of the icon; an icon that is used frequently is closer to the center. As another example, the distance can depend on whether an incoming notification has been received for (the application corresponding to) the icon. As another example, the distance can be user-defined, or can be otherwise determined by device 100 (i.e., curated).

Figure 25A:
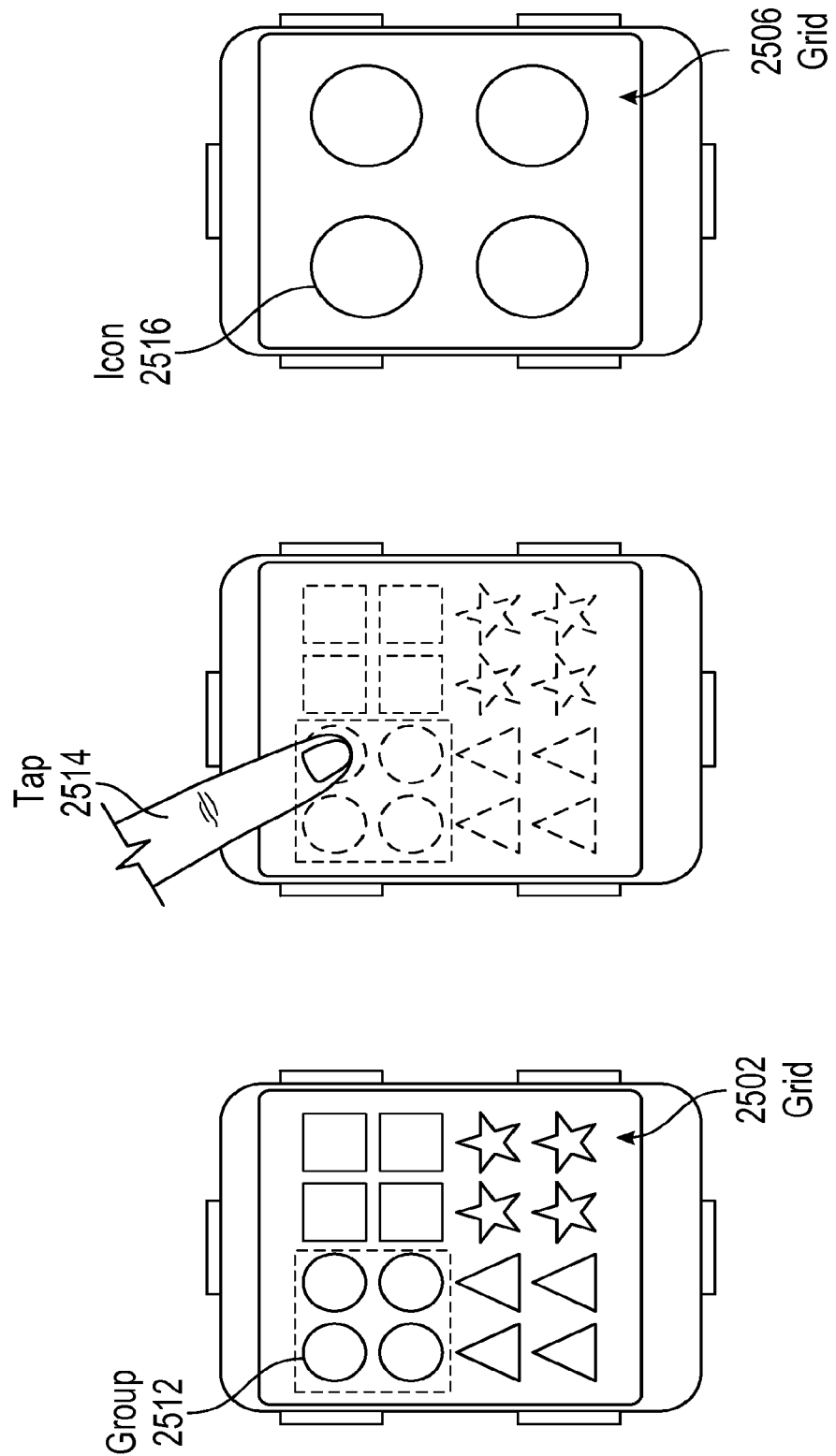
FIG. 25A and FIG. 25B illustrate an exemplary user interface.
Figure 25B:
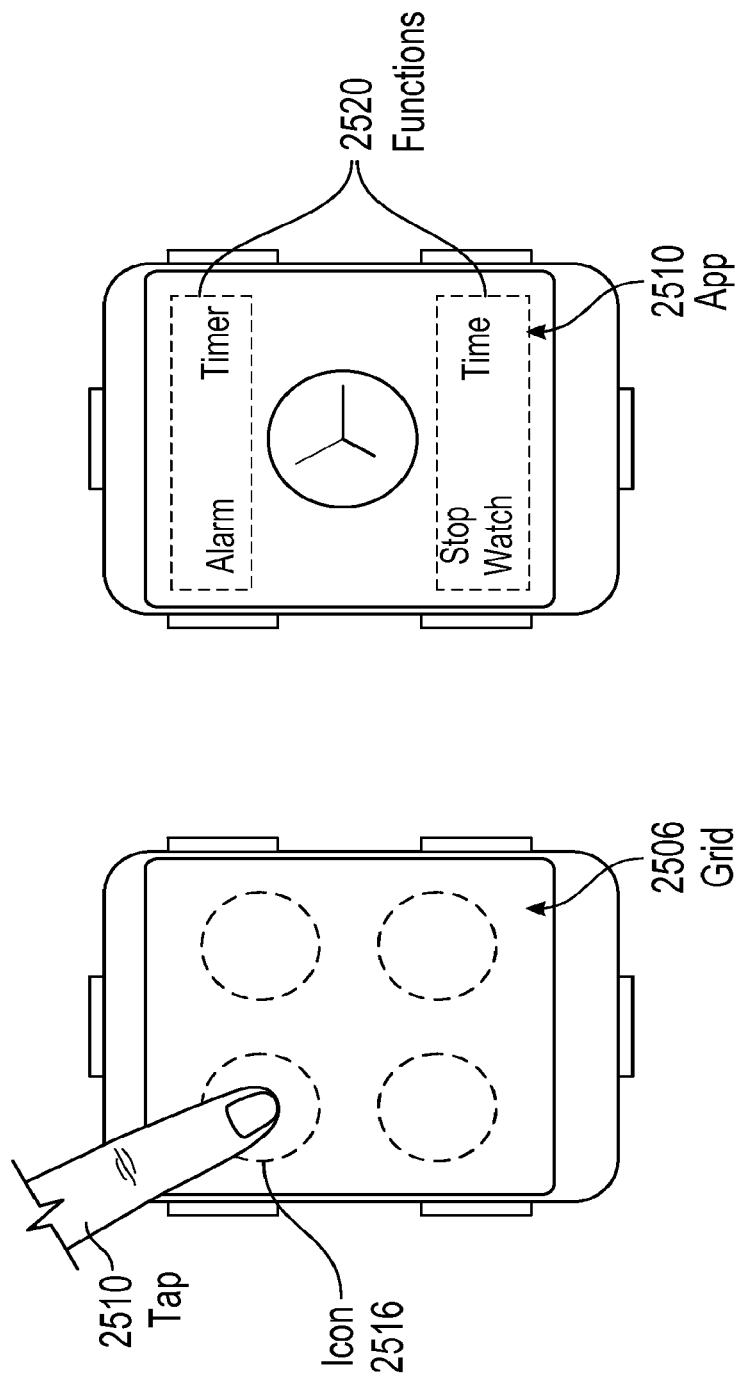

FIG. 25A illustrates an arrangement of icons into icon groups. On grid 2502, four groups of icons, including icon group 2512, are displayed. In response to a touch input, such as a finger tap at touchscreen location 2514 on group 2512, the icons within group 2512 can be displayed in enlarged form. In grid 2506, the icons within group 2512, including icon 2516, are displayed in enlarged form. FIG. 25B illustrates an arrangement of application functionalities into groups. On grid 2508, as discussed above, the four icons of icon group 2512 are displayed on grid 2506. A selection of icon 2516 (e.g., via finger tap 2518) can cause a group of functions 2520 provided by application 2510 (which corresponds to icon 2508) to be displayed.

Figure 42:
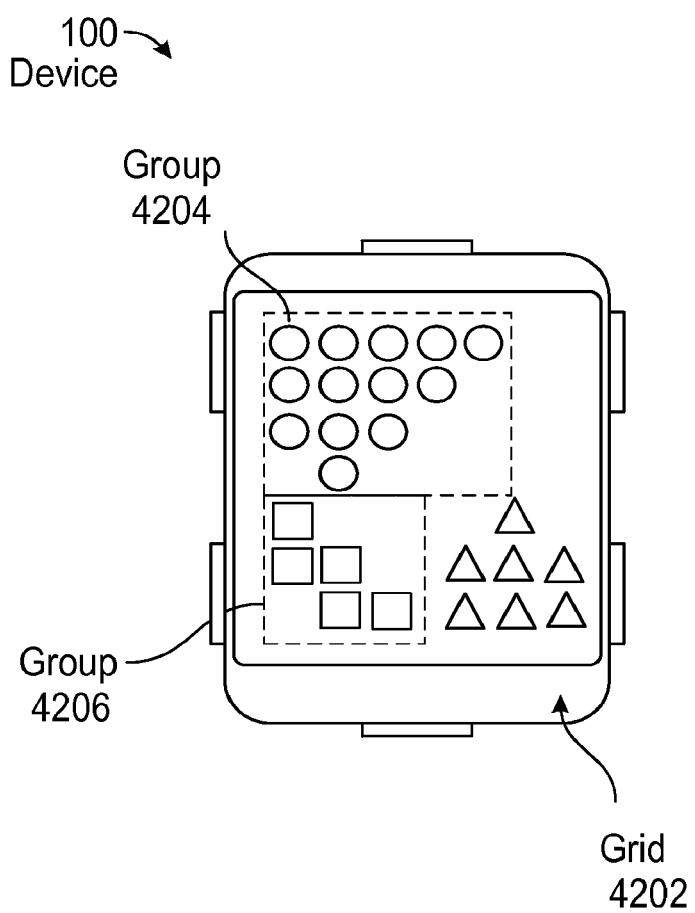
FIG. 42 illustrates an exemplary user interface.

The size and shape of icon groups can be organic or defined. Icon groups that are defined, such as icon group 2512 in grid 2502 (FIG. 25A), share a predefined group size and group shape. Organic icon groups, shown in FIG. 42, can be of a user-defined group size and/or group shape. For example, icon groups 4204 and 4206 in grid 4202 are of different user-defined shapes and sizes. In some embodiments, organic icon groups are defined using software running on a computer external to the personal electronic device and downloaded onto the personal electronic device.

FIG. 30 illustrates an icon arrangement scheme where icons are arranged similar to pages of a rolodex. Pages of exemplary rolodex 3002 can flip in response to crown rotation. For example, page (icon) 3004 can flip downward onto page (icon) 3006 in response to a crown rotation.

FIG. 31 illustrates an icon arrangement scheme where icons are arranged on the outer circumference of a spinning dial. Exemplary spinning dial 3102 can spin in response to crown rotation. For example, a crown rotation in direction 3104 can cause dial 3102 to spin in the same direction (3106). Also, a crown push (or pull) can change the number of columns in 3102, allowing the icons of the remaining columns to be enlarged and/or to have increased fidelity.

FIG. 32 illustrates an icon arrangement scheme in the form of a thumbnailed list 202. Icon 3204 within exemplary thumbnailed list 3202 can have corresponding thumbnail 3206. The icons of thumbnailed list 3202 can be traversed via crown rotation. A specific icon, such as icon 3204, can be selected directly for display by touching corresponding thumbnail 3206.

FIG. 33 illustrates an arrangement scheme where icons are aligned with the surface of an invisible sphere or polyhedron. Icons on the foreground surface of the invisible sphere, such as icon 3302, can be displayed. Icons on the far side of the invisible sphere's surface are not displayed. The invisible sphere can rotate in response to crown rotation and/or touchscreen input, thereby changing the specific icons that are displayed.

During operation, device 100 (FIG. 1) can use one or more of the icon arrangement schemes described above. The particular arrangement(s) used by device 10 can be user-selected and/or system-selected. That is, a user may be permitted to identify one or more preferred arrangements for display. Also, arrangements can be selected by device 100 based on criteria such as the total number of applications installed on the device, the number frequently accessed icons, and so forth.

Further, the specific ordering and placement of icons within a particular icon arrangement scheme can be user-selected and/or system-selected. For example, a user can be permitted to specify the position of an icon on a given screen. Also, icon placement can be determined by device 100 (i.e., curated) based on criteria such as the frequency of use of particular icons, a calculated relevance, and so forth.

4. Responses To User Input

Figure 12:
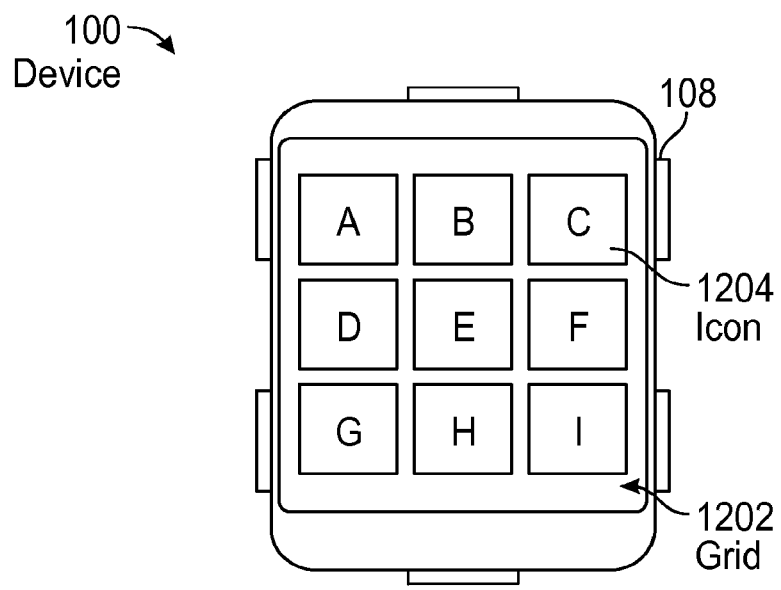
FIG. 12 illustrates an exemplary user interface.
Figure 13:
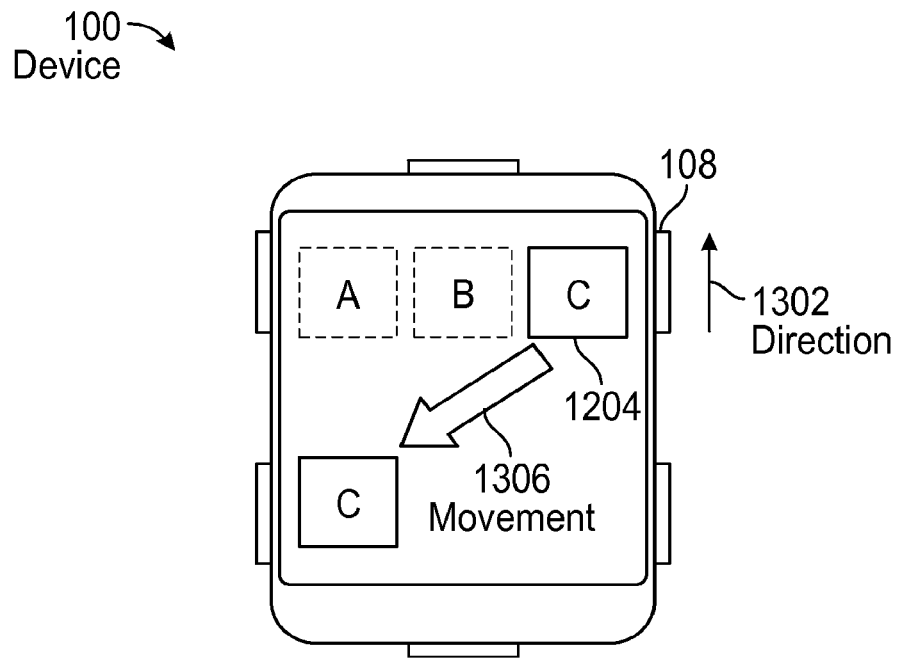
FIG. 13 illustrates an exemplary user interface transition.
Figure 14:
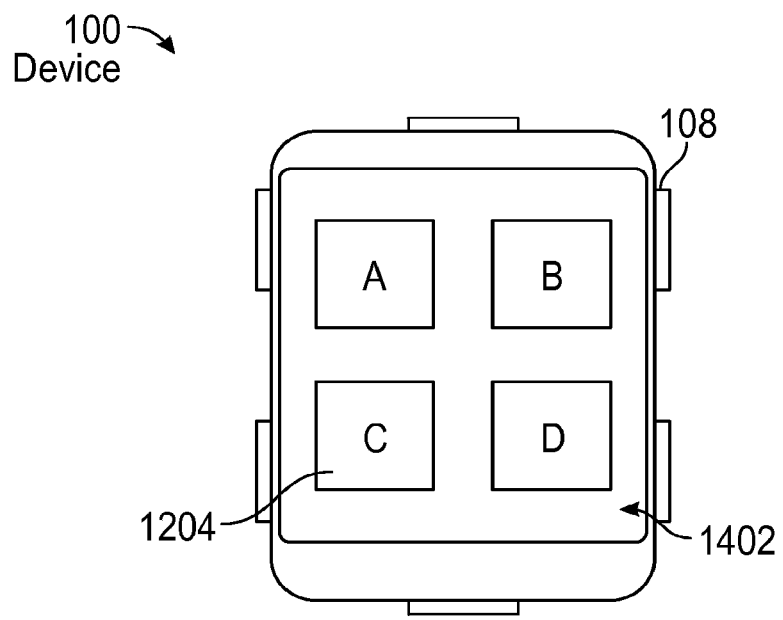
FIG. 14 illustrates an exemplary user interface.

Displayed icons can respond to user input. FIGS. 12-14 illustrate a rearrangement of displayed icons in response to crown rotation. In FIG. 12, nine icons are displayed along a 3-by-3 symmetric grid 1202. Icon 1204 is displayed in the top-right position of grid 1202. As discussed above with respect to FIGS. 4-7, a rotation of crown 108 can cause device 100 to reduce the number of displayed icons. For example, a rotation of crown 108 can cause device 100 to display a 2-by-2 grid, thereby reducing the number of displayed icons. FIG. 13 illustrates an exemplary transition to a 2-by-2 grid in response to a crown rotation in direction 1302. As shown, in response to crown rotation 1302, icon 1204 is translated visibly on-screen from its top-right position in the 3-by-3 grid of FIG. 12 to its new position in the 2-by-2 grid to be displayed. Specifically, as shown in FIG. 14, icon 1204 is translated to the lower-left corner of 2-by-2 grid 1402. Further, icons that are to remain displayed in the 2-by-2 grid after the transition from grid 1202 are enlarged and positioned into the 2-by-2 grid 1402.

Figure 15:
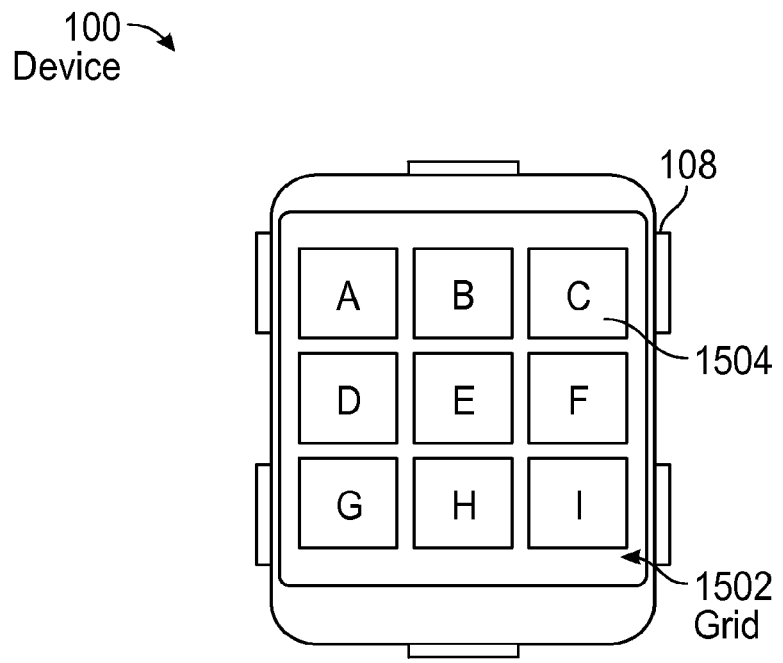
FIG. 15 illustrates an exemplary user interface.
Figure 16:
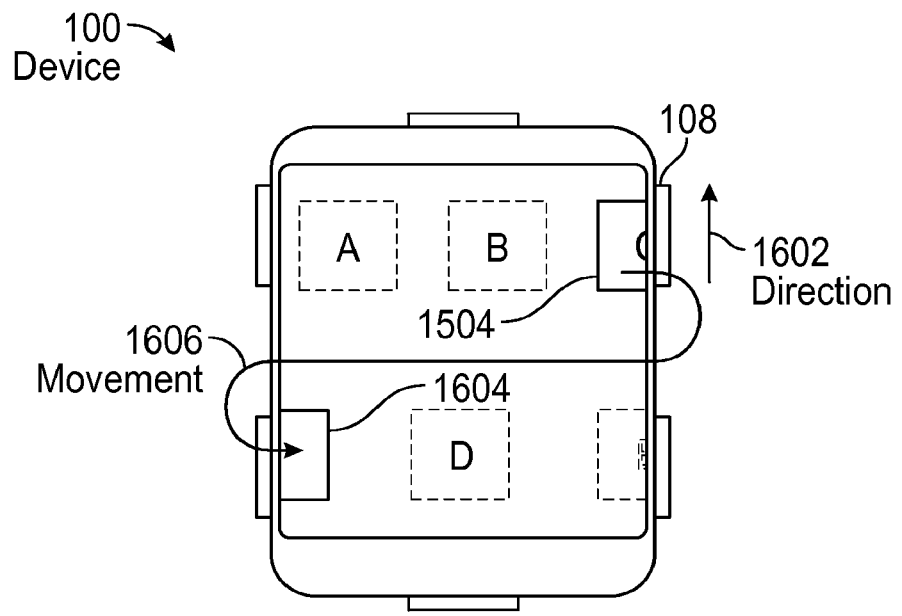
FIG. 16 illustrates an exemplary user interface transition.
Figure 17:
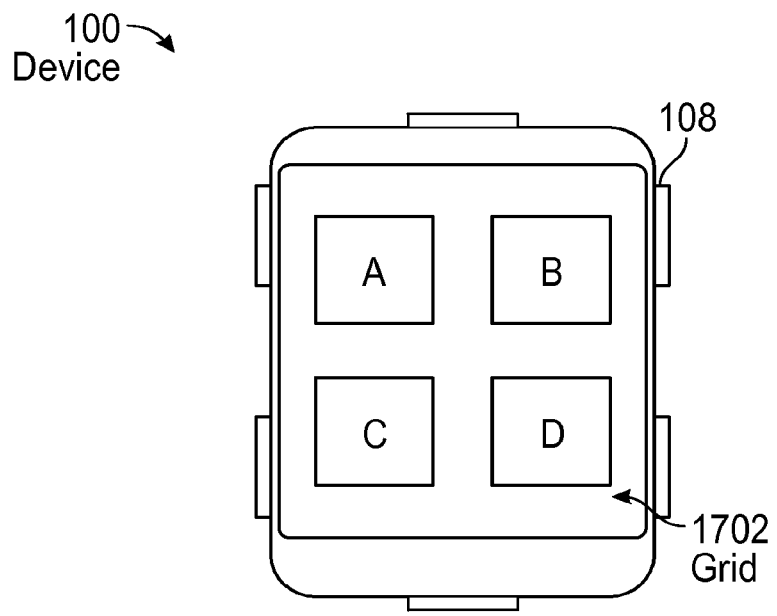
FIG. 17 illustrates an exemplary user interface.

FIGS. 15-17 illustrate another rearrangement of icons in response to crown rotation. In FIG. 15, nine icons are displayed along a 3-by-3 symmetric grid 1502. Icon 1504 is displayed in the top-right position of grid 1502. As shown in FIG. 16, in response to crown rotation 1602, icon 1504 is translated off-screen from its position in grid 1502 (FIG. 15) while it is translated into its new position in the 2-by-2 grid to be displayed. To put another way, during the transition illustrated by FIG. 16, icon 1504 can be split into two portions that are displayed in two separate, non-abutting positions of the touchscreen of device 100. More specifically, while one portion of icon 1504 remains partially displayed in the top-right corner as icon 1504 is translated off-screen, the remaining portion of 1504 is partially displayed in the lower-left corner as it is translated on-screen. As shown in FIG. 17, icon 1504 is translated to the lower-left corner of 2-by-2 grid 1702. Further, icons that are to remain displayed in the 2-by-2 grid after the transition from grid 1502 are enlarged and positioned into the 2-by-2 grid 1702.

Figure 18:
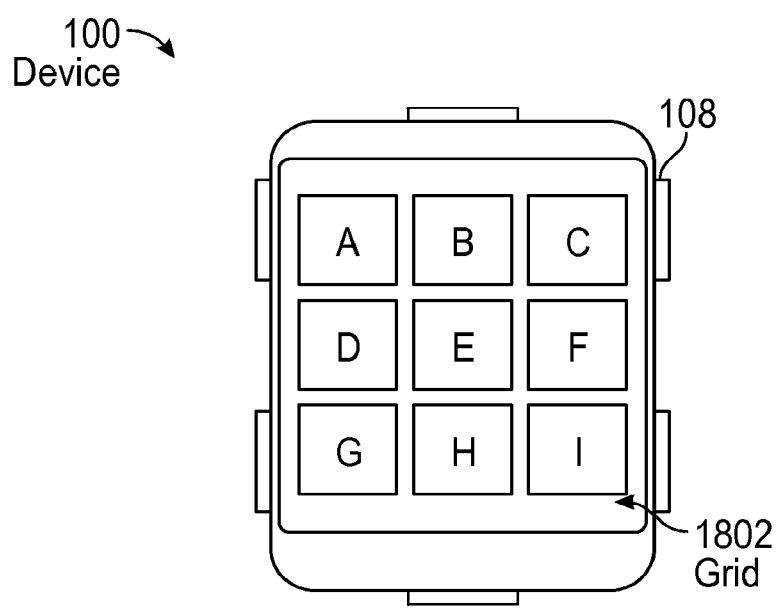
FIG. 18 illustrates an exemplary user interface.
Figure 19:
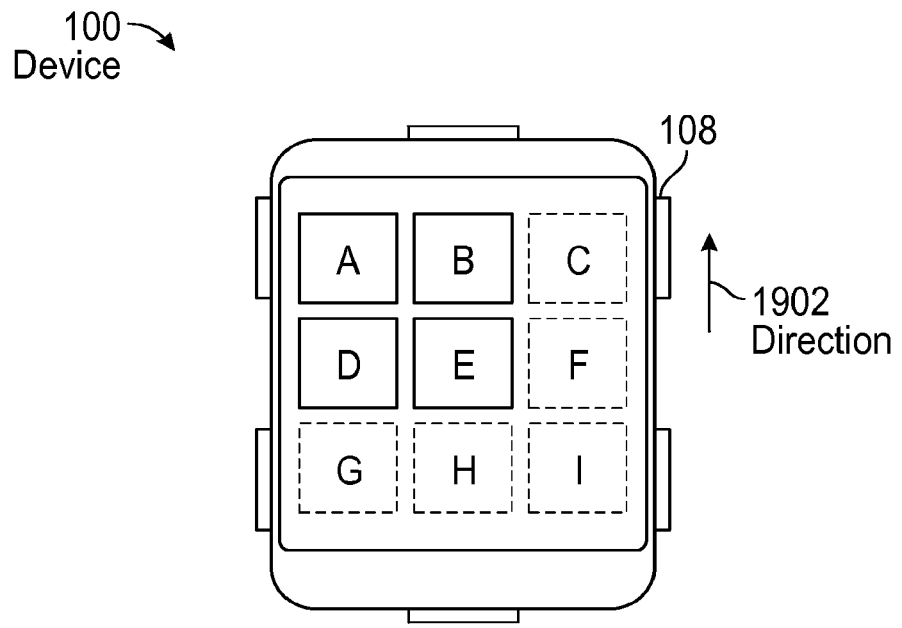
FIG. 19 illustrates an exemplary user interface transition.
Figure 20:
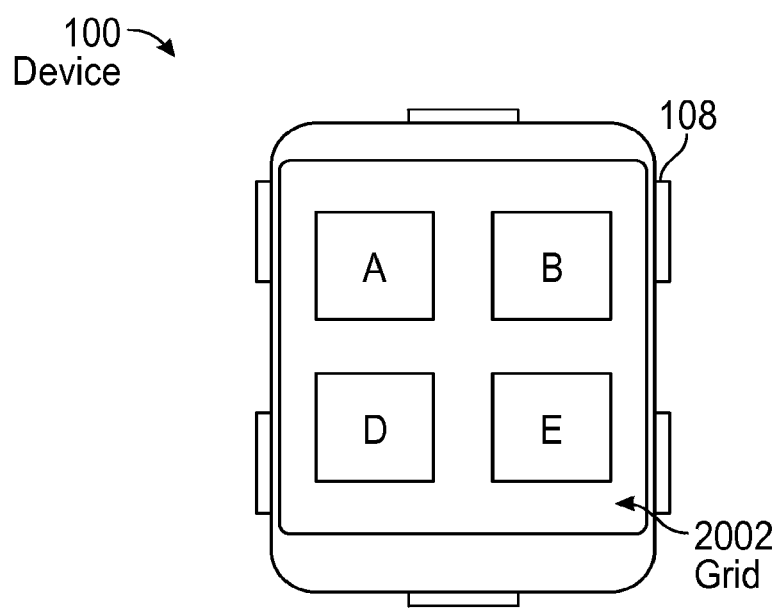
FIG. 20 illustrates an exemplary user interface.

FIGS. 18-20 illustrate another rearrangement of icons in response to crown rotation. In FIG. 18, nine icons are displayed along a 3-by-3 symmetric grid 1802. As shown in FIG. 19, in response to crown rotation 1902, the icons along the right and bottom boundaries of grid 1802 (FIG. 18) are removed from display while the remaining icons are enlarged. The remaining icons are displayed enlarged as shown in grid 2002 of FIG. 20.

It should be noted that in the exemplary screens shown in FIGS. 12-20, the icon displayed in the upper-left corner (i.e., marked "A") is anchored, meaning that the above-described transitions do not cause the icon to move away from the upper-left corner. It is possible, however, to unanchor such an icon through user input, as discussed below.

Figure 21:
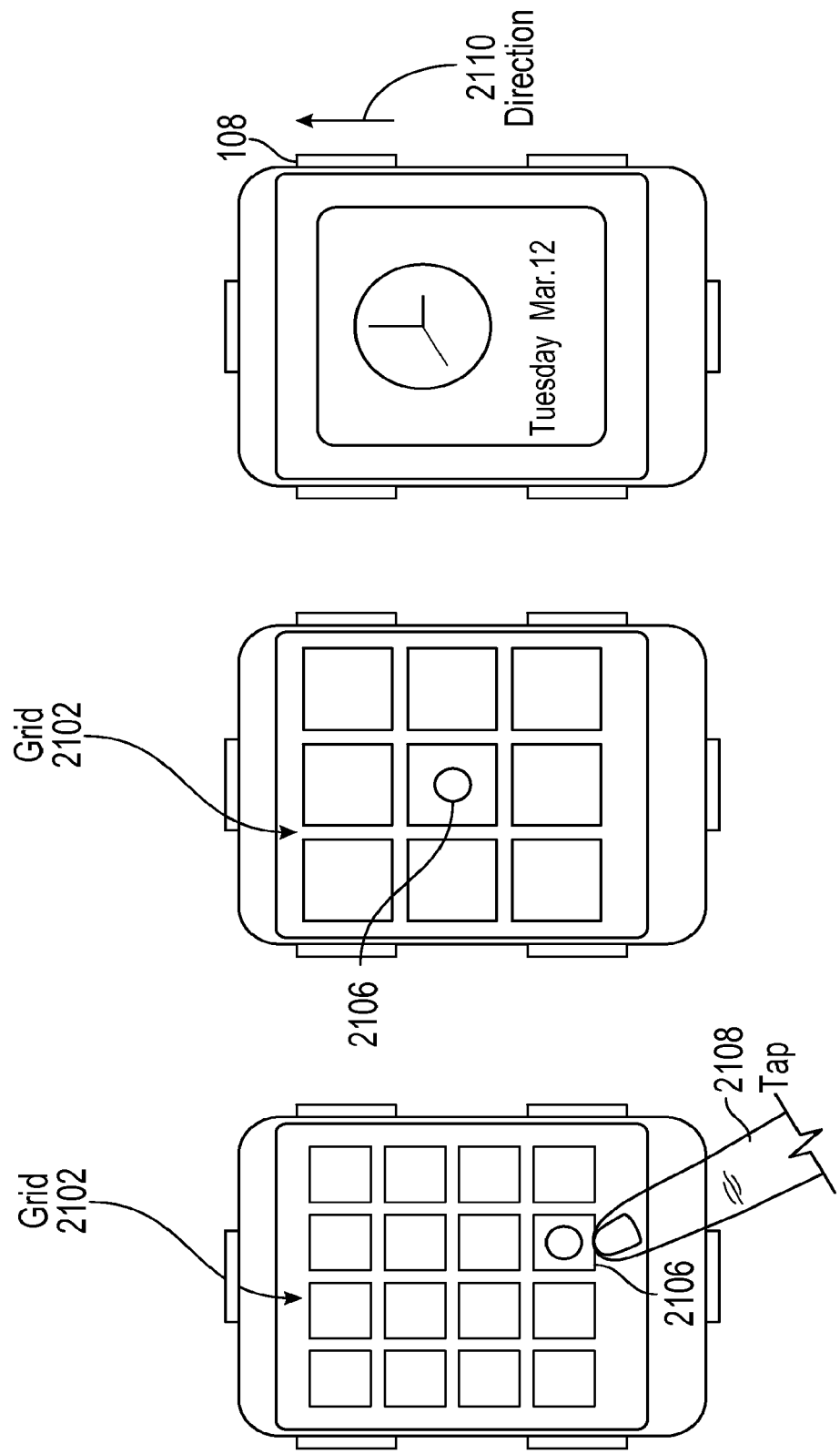
FIG. 21 illustrates an exemplary user interface.

FIG. 21 illustrates a rearrangement of icons in response to touchscreen input. As shown, icon 2106 is displayed in the bottom row of 4-by-4 grid 2012. In response to a finger tap 2104 on icon 2106, 3-by-3 grid 2108 is displayed with icon 2106 enlarged in the center. Notably, the icon marked "A," which is displayed in grid 2012, is no longer displayed in grid 2108. FIG. 21 also illustrates an update of displayed icons in response to crown rotation. Specifically, in response to crown rotation 2110, icon 2106 is further enlarged and becomes the only icon displayed on-screen.

Figure 22:
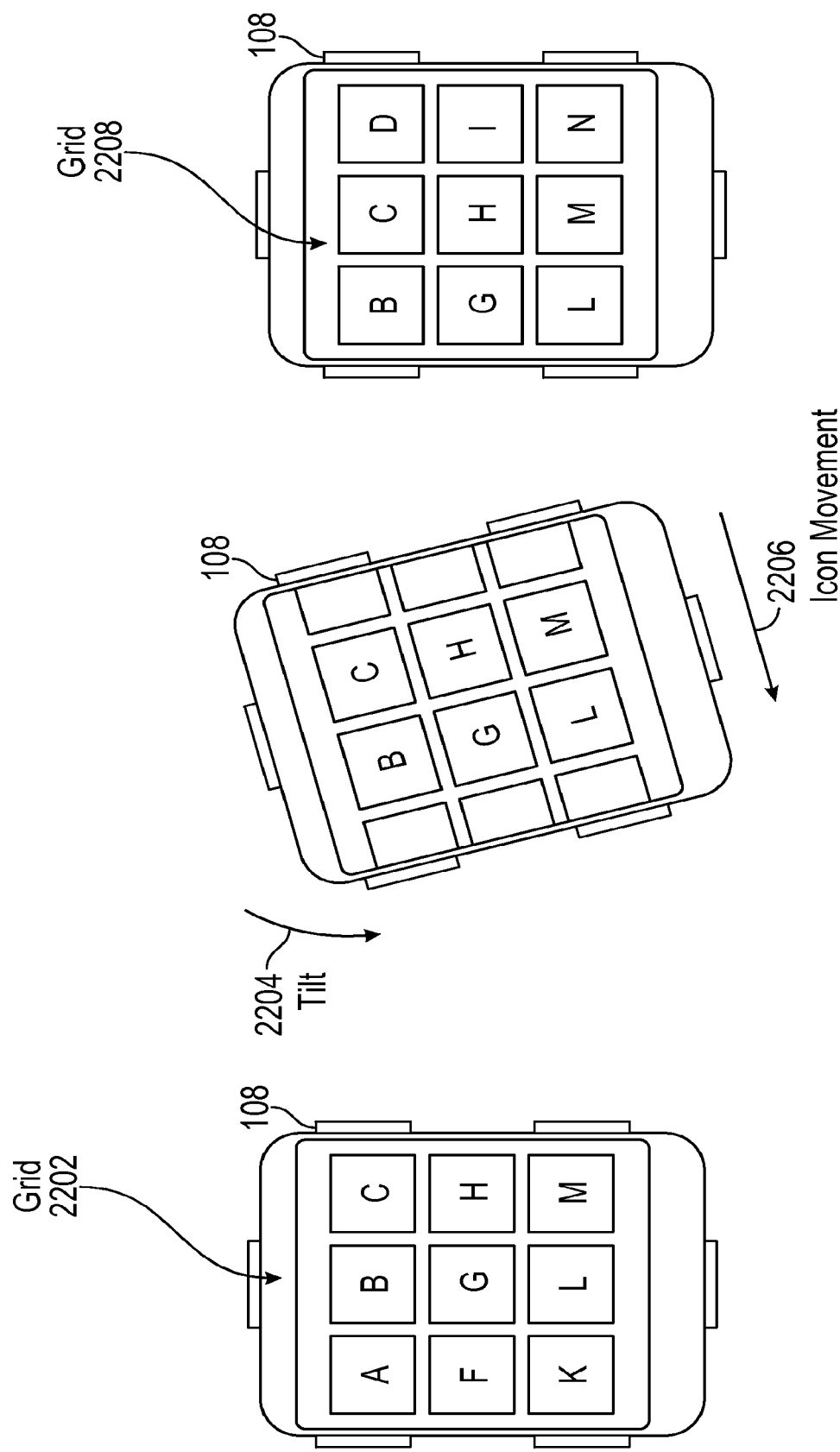
FIG. 22 illustrates an exemplary user interface and transition.

FIG. 22 illustrates a rearrangement of icons in response to movement of device 100. Device movement can be detected using one or more sensors, for example, a gyroscope. As shown, various icons are displayed in grid 2202. In response to tilting of device 100 in direction 2204, the displayed icons are translated in direction 2206, resulting in the display of different icons in grid 2208. Specifically, in response to the leftward tilting of device 100 in direction 2204, the icons of grid 2202 translate in the left direction 2206. In some embodiments, the translation may be incremental such that a single row or column transitions off a single row or column transitions onto the display. Alternatively, a whole screen of icons may transition off as a completely new set of icons transition onto the display.

Figure 23:
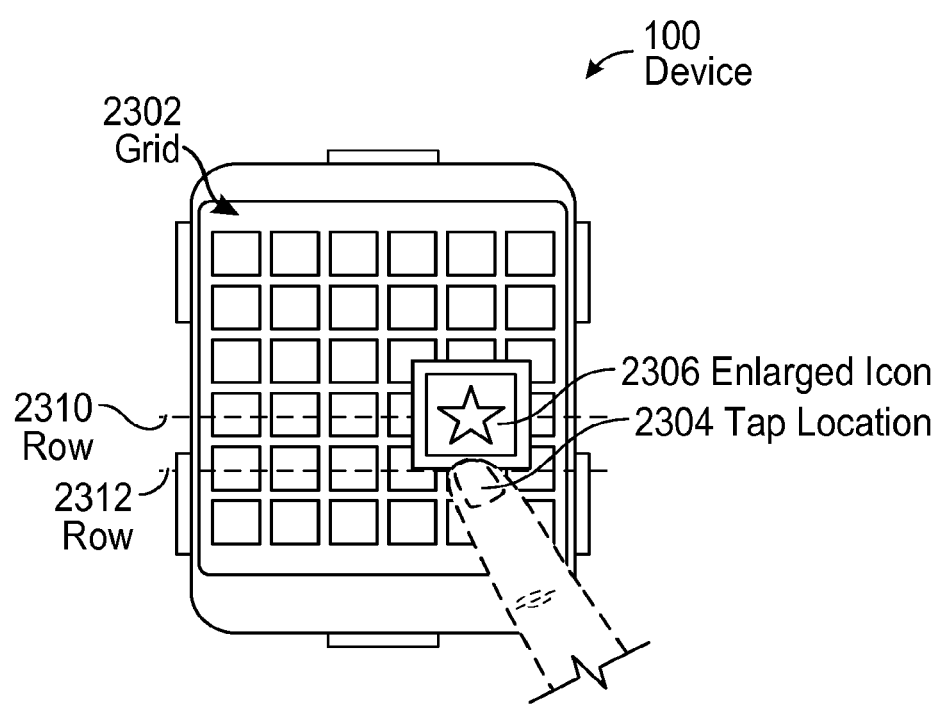
FIG. 23 illustrates an exemplary user interface.

FIG. 23 illustrates a change in icon appearance in response to touchscreen input. As shown, in response to a touch at location 2304, icon 2306 becomes enlarged. Notably, icon 2306 is not located at location 2304, rather, icon 2306 (in its unenlarged state) is in row 2310 above touch location 2304 which is along row 2312. In this way, user visibility of icon 2306 is improved both because the icon is enlarged and because the icon is not blocked from view by the potentially opaque object that is touching device 100. It should be noted that more than one icon can be enlarged in response to a nearby touch. Multiple icons can be enlarged at different levels of magnification inversely proportional to the distance between each icon being enlarged and the touch location.

Figure 40:
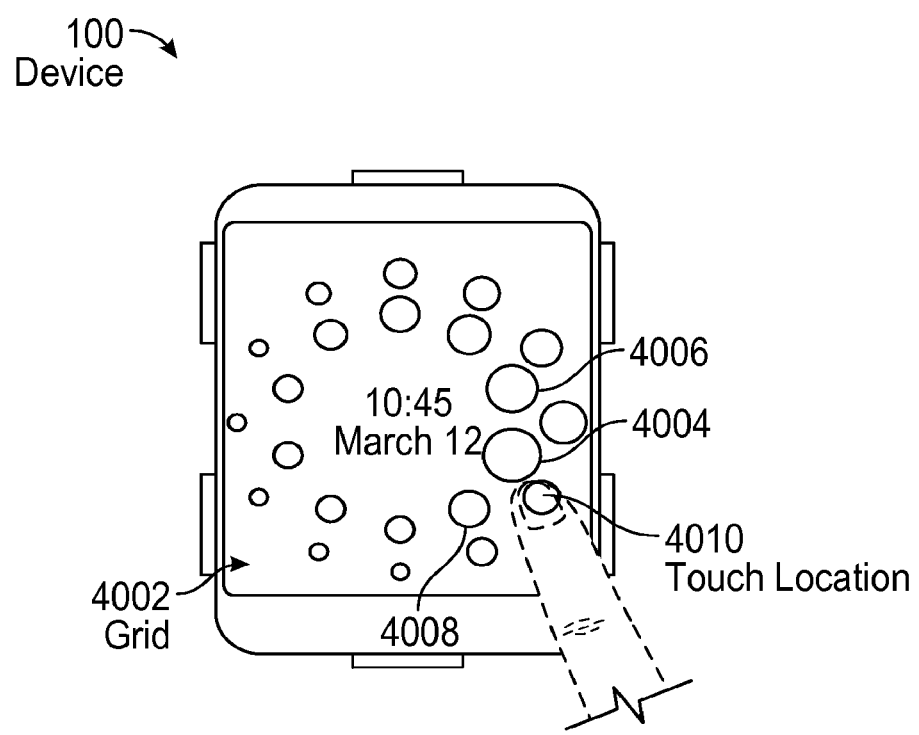
FIG. 40 illustrates an exemplary user interface.

FIG. 40 illustrates icon movements that account for physical interaction between nearby icons. As shown, grid 4002 includes a number of icons arranged in a radial arrangement. In response a touch input at location 4010, a number of icons are enlarged to at different levels of magnification. Notably, the enlarging of icon 4004 can cause adjacent icons 4006 and 4008 to move away from icon 4004 so the icons do not block each other from view.

Figure 24:
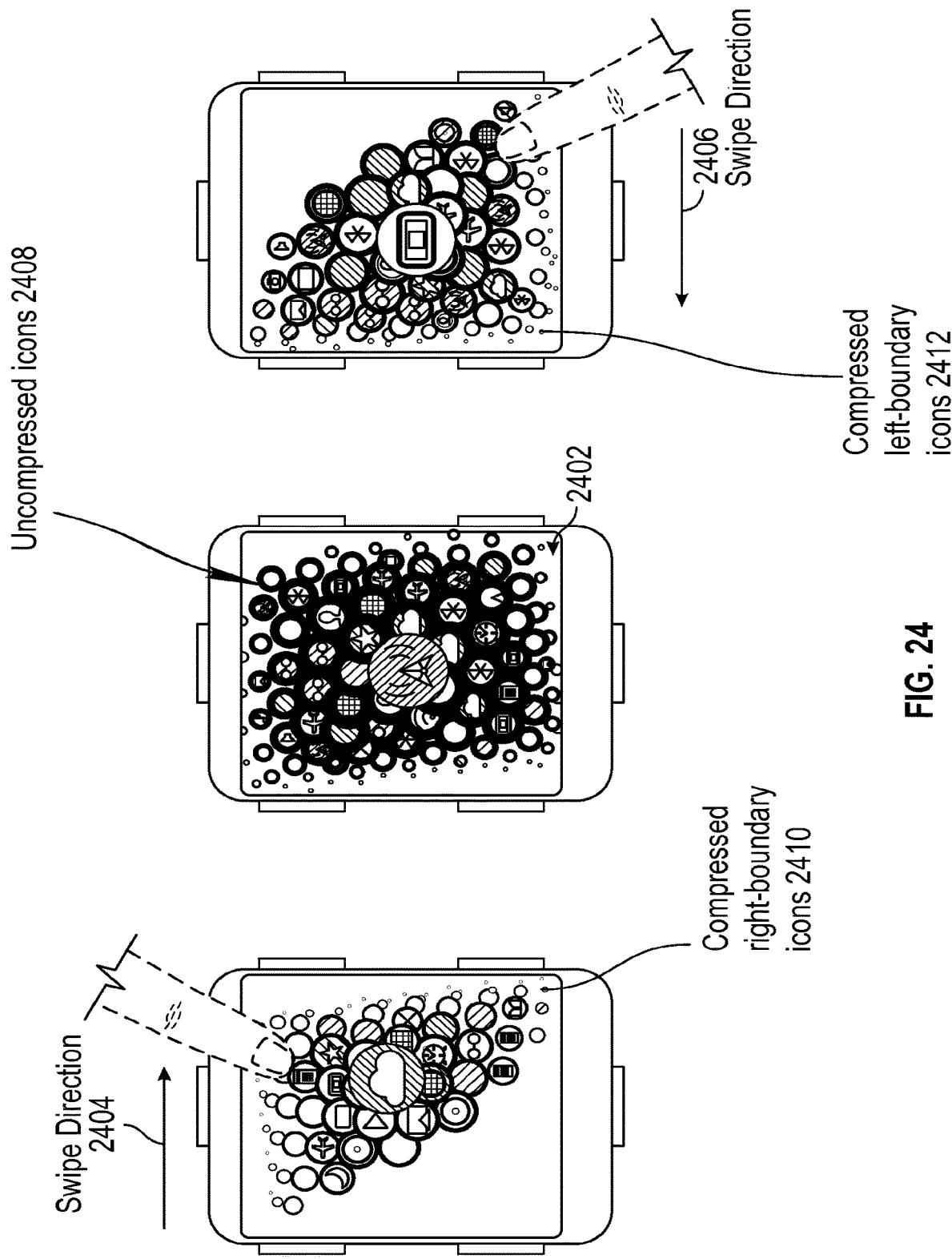
FIG. 24 illustrates an exemplary user interface and transition.

FIG. 24 illustrates icon movements that account for interaction between icons and grid boundaries. As shown, a number of icons are displayed according to non-symmetrical grid 2402. The displayed icons include uncompressed icons 2408. In response to touch input in the form of a rightward gesture in direction 2404, icons on the right boundary of grid 2402 can be compressed into compressed icons 2406 so that icons from the left side of grid 2402 are more predominately displayed either in enlarged or unenlarged form. Also, in response to a touch gesture in the leftward direction 2406, icons that are on the left boundary of grid 2402 can be compressed into compressed icons 2412 so that icons from the right side of grid 2402 are more predominately displayed. The above-described interaction allows all, or substantially all, icons to be simultaneously displayed while allowing a user to easily view and select an icon. Note that this compression may occur in a symmetrical grid, although not shown.

Figure 34:
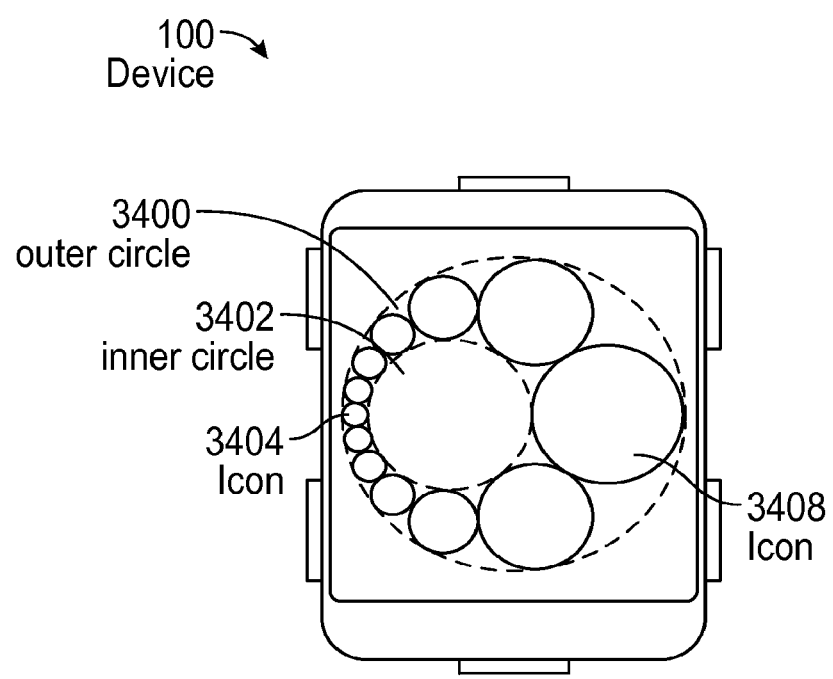
FIG. 34 illustrates an exemplary user interface.

FIG. 34 illustrates icon movements that account for interaction between grid boundaries and nearby icons. In the radial arrangement of FIG. 34, icons are arranged between invisible inner circle 3402 and invisible outer boundary circle 3400. Outer circle 3400 can be sized based on the physical size the touchscreen of device 100. Inner circle 3402 can be sized based on design and/or user preferences. Inner circle 3402 can also be sized based on user input, such as a crown rotation. Inner circle 3402 can respond to touchscreen input within its surface area. For example, a touch down that occurs within the surface area of inner circle 3402 and subsequent touch movement can be interpreted as panning of inner circle 3402. When inner circle 3402 is panned, the icons that are arranged between the inner circle 3402 and outer circle 3400, such as icons 3404 and 3408, can be resize based on the available spacing between inner circle 3402 and outer circle 3400, the number of icons being displayed, and the sizes of adjacent icons. For example, in response to the rightward panning of circle 3402, icon 3404 can increase in size, and the enlarging of icon 3404 can cause icon 3408 to decrease in size.

Note, in the absence of user input, displayed icons can be programmed to move on-screen to prevent screen burn-in. Also, icon arrangements can respond to multi-touch gestures. For example, a two-finger downward gesture on the touchscreen of device 100 (FIG. 1) can cause the display of system information such as a status bar. As another example, a two-finger gesture in which the two fingers move in opposite directions can configure device 100 (FIG. 1) for left-handed or right-handed use.

5. Additional Features

Turning back to FIG. 2, home screen 200 can display system-generated information such as alerts. For example, home screen 200 can display a reminder that the user has sat for an extended duration and exercise is in order. Also, screen 200 can display a suggestion for rest because the user has a busy calendar for the next morning. Also turning back to FIG. 3, screen 300 can be displayed when device 100 is coupled with a dock.

Figure 26:
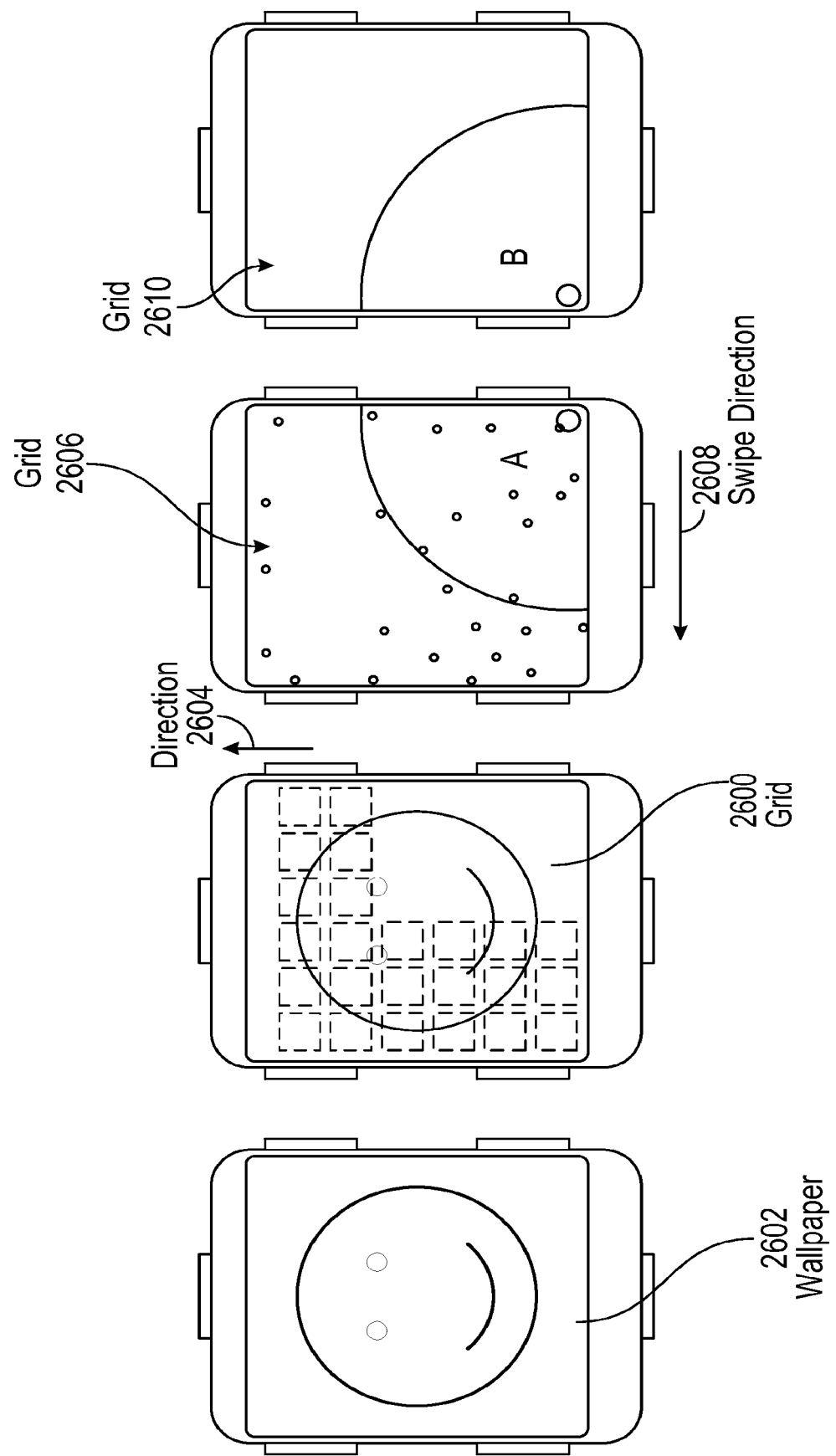
FIG. 26 illustrates an exemplary user interface.

FIG. 26 illustrates the use of wallpaper 2602 to aid user navigation in a grid of icons. As shown, grid 2600 has a relatively large number of icons. In response to crown rotation 2604, a subset of the icons from grid 2600 is enlarged and displayed in grid 2606. In addition, the corresponding portion of wallpaper 2602 displayed in the background of the subset is also displayed, meaning that, for example, if icons from the upper-left quadrant of grid 2600 become displayed in grid 2606, then the upper-left quadrant of wallpaper 2602 is also displayed with grid 2606. Also as shown, in response to a touch gesture in leftward direction 2608, device 100 can display another subset of icons from grid 2600. For example, in grid 2610, icons from the upper-right quadrant of grid 2600 are displayed together with the upper-right quadrant of wallpaper 2600. In this way, a user can determine the relationship between a set of currently displayed icons relative to the totality of icons available for display on device 100.

Figure 27:
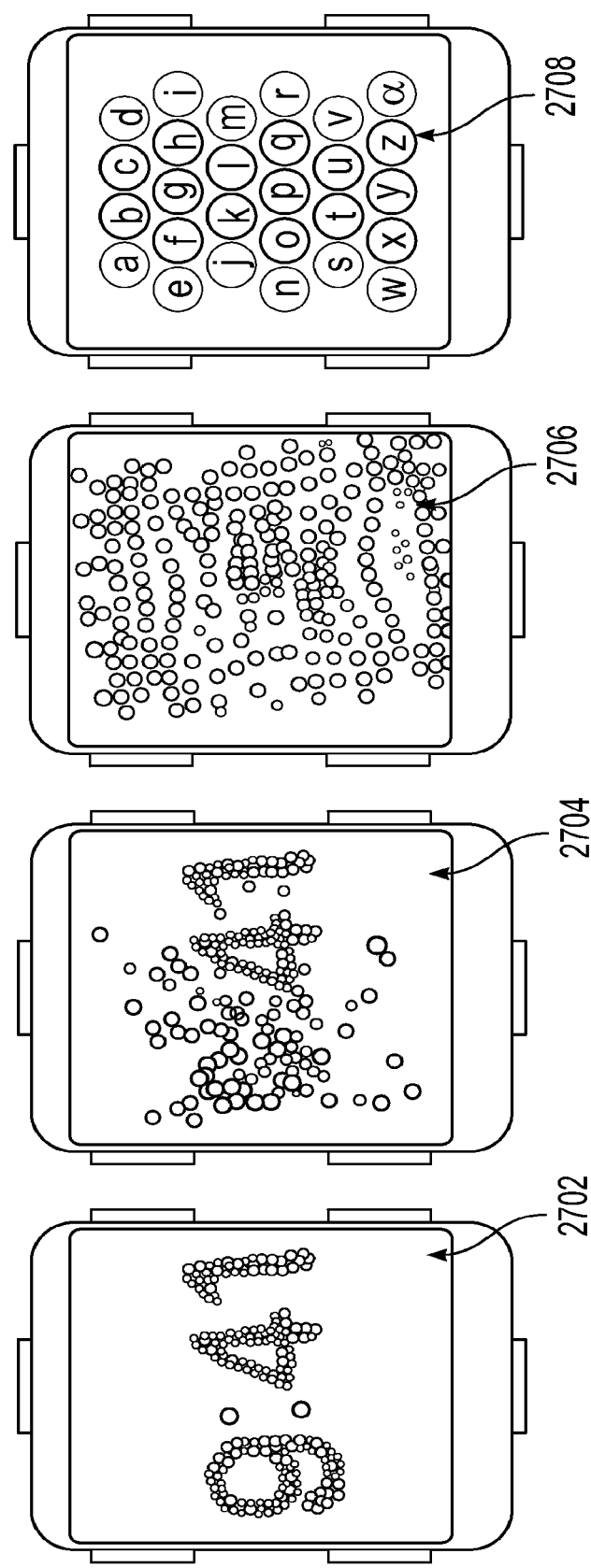
FIG. 27 illustrates an exemplary user interface and transition.

FIG. 27 illustrates an exemplary arrangement of icons where the arrangement provides information, for example current time information, to a user. The arrangement can be displayed in response to crown movement. Also, the arrangement can be displayed after a predetermined period of user input inactivity. For example, screen 2702, which uses icons in small sizes to show the current time, can be displayed after a predetermined period of user input inactivity. Further, in response to a crown rotation, screen 2702 can transition through screens 2704 and 2706 to screen 2708, which shows a grid of icons.

Figure 28:
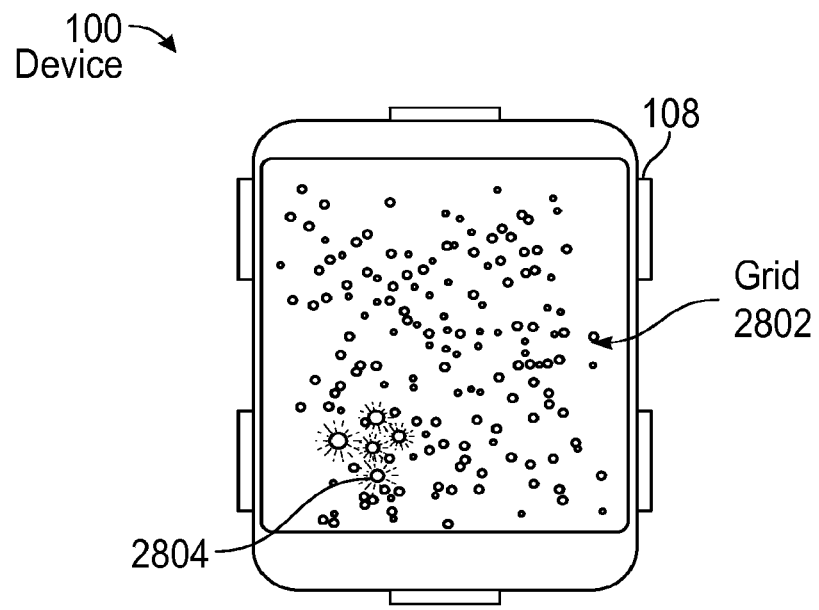
FIG. 28 illustrates an exemplary user interface.
Figure 29:
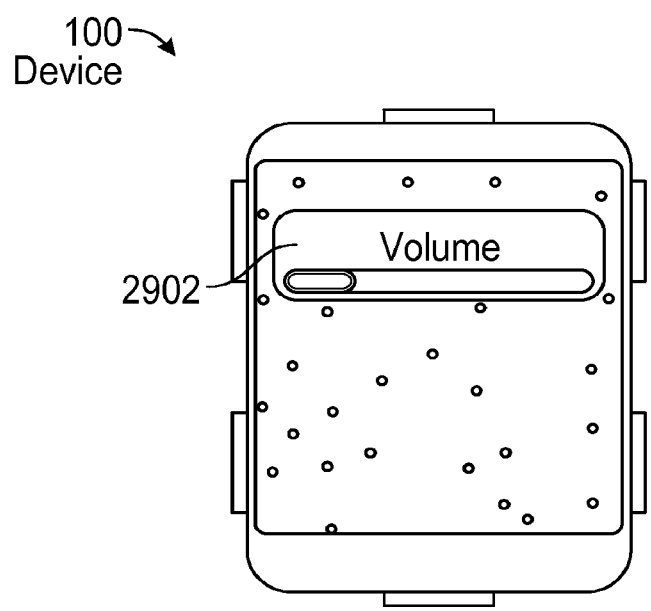
FIG. 29 illustrates an exemplary user interface.

FIG. 28 illustrates an exemplary arrangement of icons (grid 2802) where the color and/or intensity of displayed icons can change in response to incoming information. For example, icon 2804 corresponding to a messaging application can blink or glow when a new message arrives. In some embodiments, the blink or glow can correspond to the popularity of an application in an application store or frequency of use of the application in a larger ecosystem of users. Further, the icons of grid 2802 can show icons representing a larger set of applications available in an application store, beyond those applications that are installed FIG. 29 illustrates an exemplary display of a contextual message. A contextual message can be displayed in response to detection of a user's touch of crown 108. A contextual message indicates the current functionality of crown 108, which can take on different functions depending on the application that is currently operating in the foreground of device 100. For example, when a music application is operating in the foreground of device 100, a touch on crown 108 can result in the display of contextual message 2902 in the form of a volume indicator, which can indicate to a user that the current functionality of crown 108 is volume control.

Figure 35:
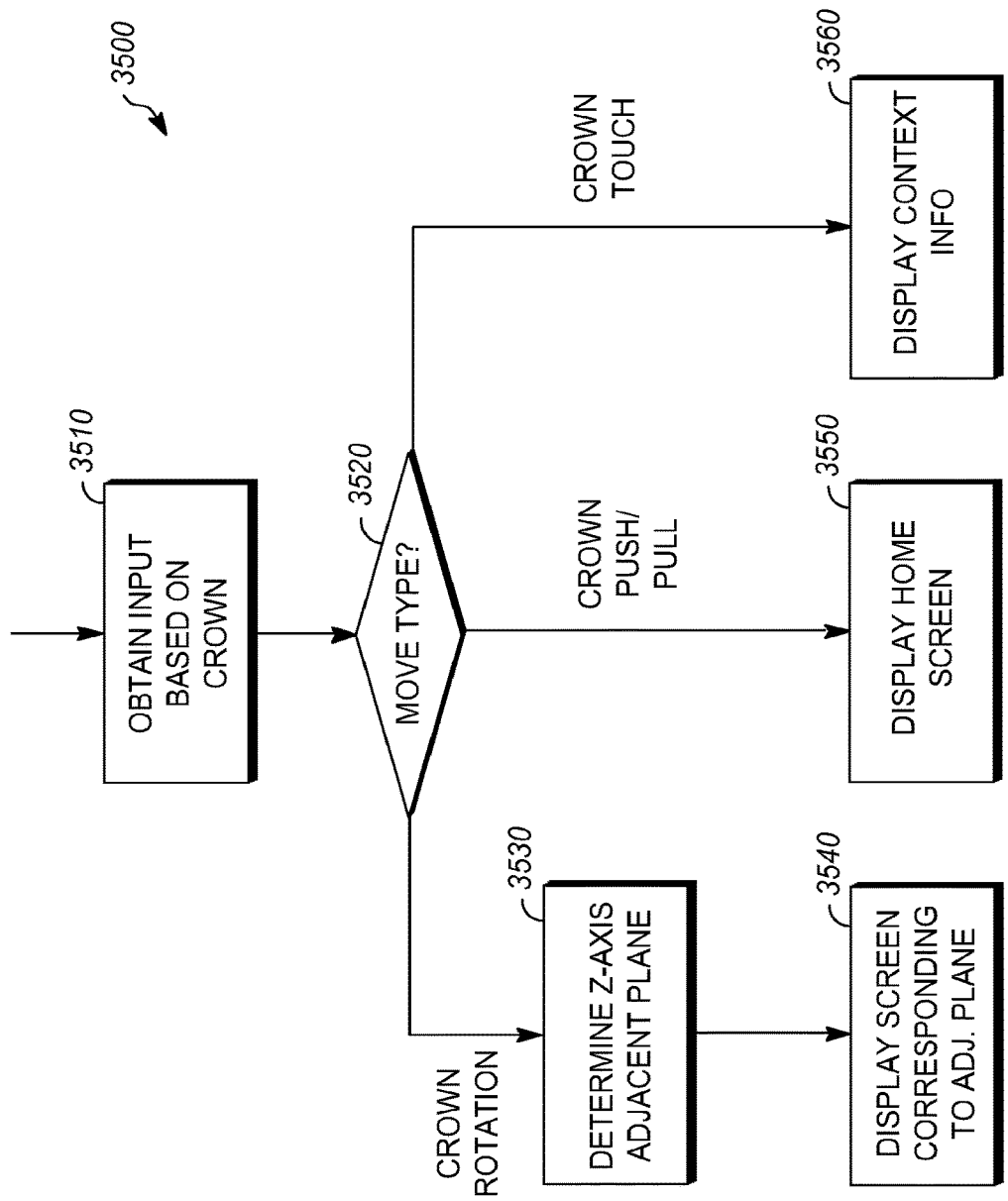
FIG. 35 illustrates an exemplary process.

FIG. 35 depicts exemplary process 3500 for providing the user interface techniques described above. At block 3510, input based on crown movement and/or crown touch is received. The crown movement can be a rotation, a push, and/or a pull. At block 3520, a decision is made based on the type of crown movement represented by the received input. If the received input represents a crown rotation, processing proceeds to block 3530. If the received input represents a crown push or pull, processing proceeds to block 3550. If the received input represents a crown touch (without a rotation or a push/pull), processing proceeds to block 3560. At block 3530, the currently displayed screen and its corresponding position along z-axis 906 (FIG. 9) can be determined In addition, an adjacent level of information along the z-axis 906 can be determined. The adjacent level can be determined based on the direction of the crown rotation that is represented by the received input. A corresponding grid of icons, such as those illustrated by each of FIGS. 4-7, can be displayed. At block 3550, a home screen, such as the exemplary screen 200 of FIG. 2, can be displayed. In the alternative, a user-favorites screen, such as the exemplary screen 300 of FIG. 3, can be displayed. At block 3560, a contextual message, such as the exemplary contextual message 2902 of FIG. 29, can be displayed.

Figure 36:
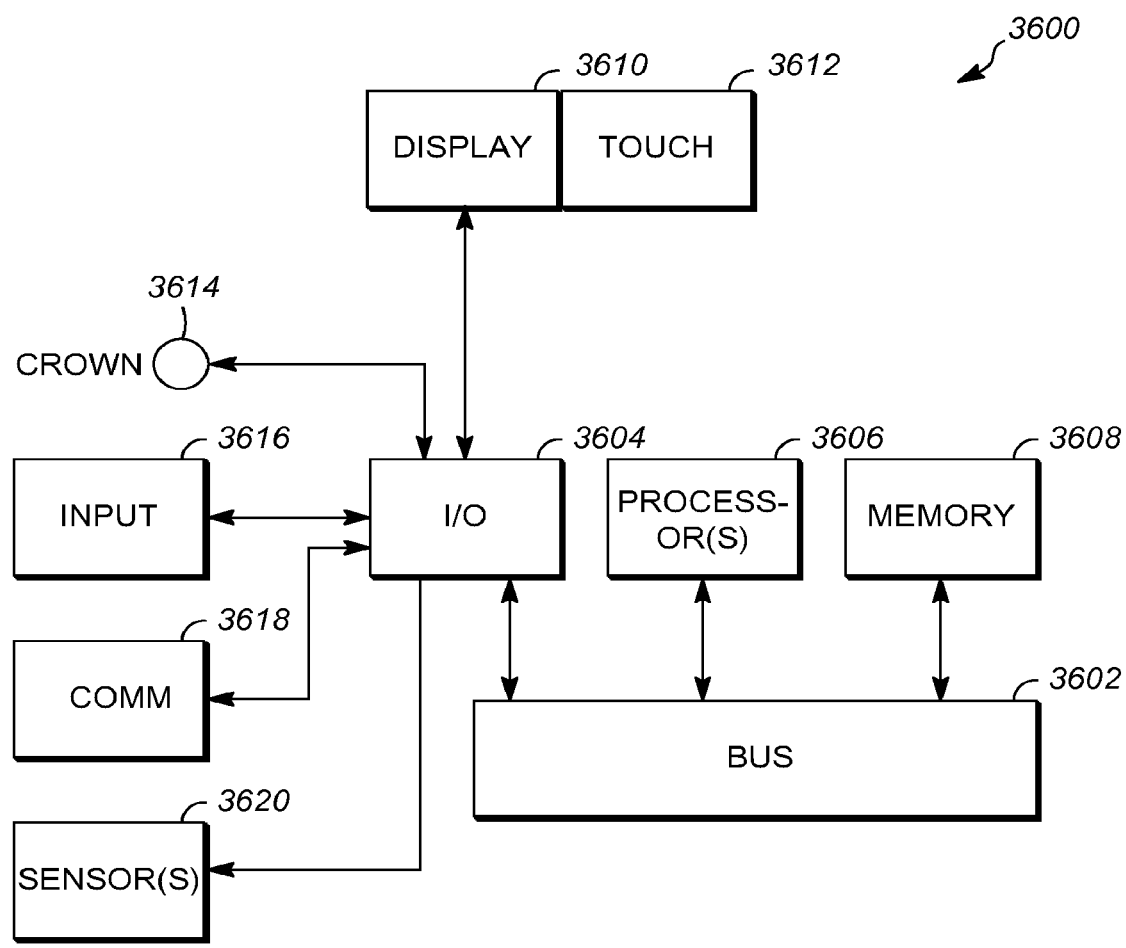
FIG. 36 illustrates an exemplary computing system.

FIG. 36 depicts exemplary computing system 3600 for providing the user interface techniques described above. In some embodiments, computing system 3600 can form device 100. As shown, computing system 3600 can have bus 3602 that connects I/O section 3604, one or more computer processors 3606, and a memory section 3608 together.

Memory section 3608 can contain computer-executable instructions and/or data for carrying out the above-described techniques, including process 3500 (FIG. 35). I/O section 3604 can be connected to display 3610, which can have a touch-sensitive component 3612. I/O section 3604 can be connected to crown 3614. I/O section 3604 can be connected to input device 3616, which may include buttons. I/O section 3604 can be connected to communication unit 3618, which can provide Wi-Fi, Bluetooth, and/or cellular features, for example. I/O section 3604 can be connected to sensor pack 3620, which can have a gyroscope, a GPS sensor, a light sensor, a gyroscope, an accelerometer, and/or a combination thereof. Note, one or more of the above-described components can be part of a system-on-a-chip.

Memory section 3608 of computing system 3600 can be a non-transitory computer readable storage medium, for storing computer-executable instructions, which, when executed by one or more computer processors 3606, for example, can cause the computer processors to perform the user interface techniques described above, including process 3500 (FIG. 35). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as RAM, ROM, EPROM, flash memory, and solid-state memory.

Computing system 3600 is not limited to the components and configuration of FIG. 36, but can include other or additional components in multiple configurations. In some embodiments, system 3600 can form personal electronic device 3700, which is a tablet, as shown in FIG. 37. In some embodiments, computing system 3600 can form personal electronic device 3800, which is a mobile phone, as shown in FIG. 38. In some embodiments, computing system 3600 can form personal electronic device 3900, which is a portal music device, as shown in FIG. 39.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. A non-transitory computer-readable storage medium comprising computer-executable instructions for execution by one or more processors of a wearable electronic device, the computer-executable instructions including instructions for:

displaying a first plurality of application icons on a touch-sensitive display of the wearable electronic device, wherein the first plurality of application icons are displayed at a first aspect ratio;

receiving a first input based on a movement of a physical crown of the wearable electronic device;

in response to the received first input, replacing the first plurality of application icons with a second plurality of applications icons on the touch-sensitive display;

wherein the second plurality of application icons is a subset of the first plurality of application icons and each application icon of the second plurality of application icons is displayed at the first aspect ratio;

while displaying the second plurality of application icons, receiving a second input, wherein the second input is a swipe gesture on the touch-sensitive display in a first direction; and in response to receiving the second input:

moving a third plurality of applications icons on the touch-sensitive display in the first direction away from a center of the touch-sensitive display and decreasing a size of each of the third plurality of application icons while maintaining the first aspect ratio for each of the third plurality of application icons, wherein the third plurality of application icons are a subset of the second plurality of application icons; and moving a fourth plurality of applications icons on the touch-sensitive display in the first direction toward the center of the touch-sensitive display and increasing a size of at least one of the fourth plurality of application icons while maintaining the first aspect ratio for each of the fourth plurality of application icons, wherein the fourth plurality of application icons are a subset of the second plurality of application icons.

2. The non-transitory computer-readable storage medium of claim 1, wherein the wearable electronic device is a watch.

3. The non-transitory computer-readable storage medium of claim 1, wherein the movement is a push, pull on the physical crown.

4. The non-transitory computer-readable storage medium of claim 1, wherein the movement is a rotation of the physical crown.

5. The non-transitory computer-readable storage medium of claim 4, wherein the rotation is in a first rotation direction.

6. The non-transitory computer-readable storage medium of claim 4, wherein the rotation exceeds a predetermined angular velocity threshold.

7. The non-transitory computer-readable storage medium of claim 1, wherein the physical crown comprises a capacitive touch sensor configured to sense a touch input, and wherein the received first input is further based on the touch input on the physical crown.

8. The non-transitory computer-readable storage medium of claim 1, wherein a first application icon of the first plurality of application icons is associated with an application, and a second application icon of the second plurality of application icons is associated with the same application, the non-transitory computer-readable storage medium further comprising computer-executable instructions for:

displaying the second application icon with information regarding the application, when the second plurality of application icons is displayed, and displaying the first application icon with different information regarding the application, when the first plurality of application icons is display.

9. The non-transitory computer-readable storage medium of claim 1, wherein a first density of information is associated with the first plurality of application icons and a second density of information is associated with the second plurality of application icons.

10. The non-transitory computer-readable storage medium of claim 1, wherein the received first input is a first received input in a first direction, the computer-executable instructions further comprising instructions for:
   receiving a third input based on a second movement of the physical crown; and
   in response to the received third input, replacing the second plurality of application icons with the first plurality of application icons on the touch-sensitive display.

11. The non-transitory computer-readable storage medium of claim 10, wherein the second movement is a rotation of the physical crown in a second direction opposite the first direction.

12. The non-transitory computer-readable storage medium of claim 10, wherein the second movement is a push or pull of the physical crown.

13. The non-transitory computer-readable storage medium of claim 1, wherein the received first input is a first received input in a first direction, the non-transitory computer-readable storage medium further comprising computer-executable instructions for:
   receiving a third input based on a second movement of the physical crown, wherein the second movement is a rotation in the first direction; and
   in response to the received third input, replacing the display of the second plurality of application icons with a third plurality of application icons,
   wherein the third plurality of application icons is a subset of the second plurality of application icons.

14. The non-transitory computer-readable storage medium of claim 1, wherein the received first input is a first received input in a first direction, the non-transitory computer-readable storage medium further comprising computer-executable instructions for:
   receiving a third input based on a second movement of the physical crown, wherein the second movement is a rotation in the first direction; and
   in response to the received third input, launching an application associated with an application icon of the second plurality of application icons.

15. The non-transitory computer-readable storage medium of claim 1, further comprising computer-executable instructions for:
   receiving information representing an activity in an application, wherein the application corresponds to a displayed application icon; and
   in response to the received information, altering an appearance of the displayed application icon.

16. The non-transitory computer-readable storage medium of claim 15, wherein the altering is one or more of blinking, changing color, and animating.

17. The non-transitory computer-readable storage medium of claim 1, wherein the first plurality of icons includes a top-right application icon and the top-right icon of the first plurality of application icons is not displayed as part of the second plurality of application icons.

18. The non-transitory computer-readable storage medium of claim 1, wherein the first plurality of icons includes a top-right application icon and the top-right icon of the first plurality of application icons is displayed as a left-most application icon in a second top-most row in the second plurality of application icons.

19. The non-transitory computer-readable storage medium of claim 18, wherein the replacing of the display of the first plurality of application icons to the second plurality of application icons comprises:
   translating an application icon of the first plurality of application icons, from a first position of the touch-sensitive display, to a second position of the touch-sensitive display,
   wherein the application icon is displayed, in whole, on the touch-sensitive display during the translating.

20. The non-transitory computer-readable storage medium of claim 18, wherein the replacing of the display of the first plurality of application icons to the second plurality of application icons comprises:
   displaying, at a first position of the touch-sensitive display, only a portion of an application icon of the first plurality of application icons; and
   displaying the remaining portion of the application icon in a second position of the touch-sensitive display, wherein the first position and the second position are separate.

21. The non-transitory computer-readable storage medium of claim 1, wherein the physical crown is a mechanical crown.

22. The non-transitory computer-readable storage medium of claim 1, further comprising computer-executable instructions for:
   detecting a force applied to the touch-sensitive display; and
   replacing the first plurality of application icons based on the detected force.

23. A wearable electronic device comprising:
   one or more processors;
   a physical crown operatively coupled to the one or more processors; and
   a touch-sensitive display operatively coupled to the one or more processors, the
   one or more processors configured to:
      display a first plurality of application icons on a touch-sensitive display of the wearable electronic device, wherein the first plurality of application icons are displayed at a first aspect ratio;
      receive a first input based on a movement of a physical crown of the wearable electronic device;
      in response to the received first input, replace the first plurality of application icons with a second plurality of applications icons on the touch-sensitive display;
      wherein the second plurality of application icons is a subset of the first plurality of application icons and each application icon of the second plurality of application icons is displayed at the first aspect ratio;
      while displaying the second plurality of application icons, receive a second input, wherein the second input is a swipe gesture on the touch-sensitive display in a first direction; and
      in response to receiving the second input:
         move a third plurality of applications icons on the touch-sensitive display in the first direction away from a center of the touch-sensitive display and decreasing a size of each of the third plurality of application icons while maintaining the first aspect ratio for each of the third plurality of application icons, wherein the third plurality of application icons are a subset of the second plurality of application icons; and
         move a fourth plurality of applications icons on the touch-sensitive display in the first direction toward the center of the touch-sensitive display and increasing a size of at least one of the fourth plurality of application icons while maintaining the first aspect ratio for each of the fourth plurality of application icons, wherein the fourth plurality of application icons are a subset of the second plurality of application icons.

24. A method, comprising:
at a wearable electronic device:
displaying a first plurality of application icons on a touch-sensitive display of the wearable electronic device, wherein the first plurality of application icons are displayed at a first aspect ratio;
receiving a first input based on a movement of a physical crown of the wearable electronic device;
in response to the received first input, replacing the first plurality of application icons with a second plurality of applications icons on the touch-sensitive display;
wherein the second plurality of application icons is a subset of the first plurality of application icons and each application icon of the second plurality of application icons is displayed at the first aspect ratio;
while displaying the second plurality of application icons, receiving a second input, wherein the second input is a swine gesture on the touch-sensitive display in a first direction; and
in response to receiving the second input:
moving a third plurality of applications icons on the touch-sensitive display in the first direction away from a center of the touch-sensitive display and decreasing a size of each of the third plurality of application icons while maintaining the first aspect ratio for each of the third plurality of application icons, wherein the third plurality of application icons are a subset of the second plurality of application icons; and
moving a fourth plurality of applications icons on the touch-sensitive display in the first direction toward the center of the touch-sensitive display and increasing a size of at least one of the fourth plurality of application icons while maintaining the first aspect ratio for each of the fourth plurality of application icons, wherein the fourth plurality of application icons are a subset of the second plurality of application icons.

25. The electronic device of claim 23, wherein the wearable electronic device is a watch.

26. The electronic device of claim 23, wherein the movement is a push, pull on the physical crown.

27. The electronic device of claim 23, wherein the movement is a rotation of the physical crown.

28. The electronic device of claim 27, wherein the rotation is in a first rotation direction.

29. The electronic device of claim 27, wherein the rotation exceeds a predetermined angular velocity threshold.

30. The electronic device of claim 23, wherein the physical crown comprises a capacitive touch sensor configured to sense a touch input, and wherein the received first input is further based on the touch input on the physical crown.

31. The electronic device of claim 23, wherein a first application icon of the first plurality of application icons is associated with an application, and a second application icon of the second plurality of application icons is associated with the same application, the one or more processors further configured to:
display the second application icon with information regarding the application, when the second plurality of application icons is displayed, and
display the first application icon with different information regarding the application, when the first plurality of application icons is display.

32. The electronic device of claim 23, wherein a first density of information is associated with the first plurality of application icons and a second density of information is associated with the second plurality of application icons.

33. The electronic device of claim 23, wherein the received first input is a first received input in a first direction, the one or more processors further configured to:
receive a third input based on a second movement of the physical crown; and
in response to the received third input, replace the second plurality of application icons with the first plurality of application icons on the touch-sensitive display.

34. The electronic device of claim 33, wherein the second movement is a rotation of the physical crown in a second direction opposite the first direction.

35. The electronic device of claim 33, wherein the second movement is a push or pull of the physical crown.

36. The electronic device of claim 23, wherein the received first input is a first received input in a first direction, the one or more processors further configured to:
receive a third input based on a second movement of the physical crown, wherein the second movement is a rotation in the first direction; and
in response to the received third input, replace the display of the second plurality of application icons with a third plurality of application icons,
wherein the third plurality of application icons is a subset of the second plurality of application icons.

37. The electronic device of claim 23, wherein the received first input is a first received input in a first direction, the one or more processors further configured to:
receive a third input based on a second movement of the physical crown, wherein the second movement is a rotation in the first direction; and
in response to the received third input, launch an application associated with an application icon of the second plurality of application icons.

38. The electronic device of claim 23, the one or more processors further configured to:
receive information representing an activity in an application, wherein the application corresponds to a displayed application icon; and
in response to the received information, alter an appearance of the displayed application icon.

39. The electronic device of claim 38, wherein the altering is one or more of blinking, changing color, and animating.

40. The electronic device of claim 23, wherein the first plurality of icons includes a top-right application icon and the top-right icon of the first plurality of application icons is not displayed as part of the second plurality of application icons.

41. The electronic device of claim 23, wherein the first plurality of icons includes a top-right application icon and the top-right icon of the first plurality of application icons is displayed as a left-most application icon in a second topmost row in the second plurality of application icons.

42. The electronic device of claim 41, wherein the replacing of the display of the first plurality of application icons to the second plurality of application icons comprises:
translating an application icon of the first plurality of application icons, from a first position of the touch-sensitive display, to a second position of the touch-sensitive display,
wherein the application icon is displayed, in whole, on the touch-sensitive display during the translating.

43. The electronic device of claim 41, wherein the replacing of the display of the first plurality of application icons to the second plurality of application icons comprises:
  displaying, at a first position of the touch-sensitive display, only a portion of an application icon of the first plurality of application icons; and
  displaying the remaining portion of the application icon in a second position of the touch-sensitive display, wherein the first position and the second position are separate.

44. The electronic device of claim 23, wherein the physical crown is a mechanical crown.

45. The electronic device of claim 23, the one or more processors further configured to:
  detect a force applied to the touch-sensitive display; and
  replace the first plurality of application icons based on the detected force.

46. The method of claim 24, wherein the wearable electronic device is a watch.

47. The method of claim 24, wherein the movement is a push, pull on the physical crown.

48. The method of claim 24, wherein the movement is a rotation of the physical crown.

49. The method of claim 48, wherein the rotation is in a first rotation direction.

50. The method of claim 48, wherein the rotation exceeds a predetermined angular velocity threshold.

51. The method of claim 24, wherein the physical crown comprises a capacitive touch sensor configured to sense a touch input, and wherein the received first input is further based on the touch input on the physical crown.

52. The method of claim 24, wherein a first application icon of the first plurality of application icons is associated with an application, and a second application icon of the second plurality of application icons is associated with the same application, the method further comprising:
  displaying the second application icon with information regarding the application, when the second plurality of application icons is displayed, and
  displaying the first application icon with different information regarding the application, when the first plurality of application icons is display.

53. The method of claim 24, wherein a first density of information is associated with the first plurality of application icons and a second density of information is associated with the second plurality of application icons.

54. The method of claim 24, wherein the received first input is a first received input in a first direction, the method further comprising:
  receiving a third input based on a second movement of the physical crown; and
  in response to the received third input, replacing the second plurality of application icons with the first plurality of application icons on the touch-sensitive display.

55. The method of claim 54, wherein the second movement is a rotation of the physical crown in a second direction opposite the first direction.

56. The method of claim 54, wherein the second movement is a push or pull of the physical crown.

57. The method of claim 24, wherein the received first input is a first received input in a first direction, the method further comprising:
  receiving a third input based on a second movement of the physical crown, wherein the second movement is a rotation in the first direction; and
  in response to the received third input, replacing the display of the second plurality of application icons with a third plurality of application icons,
  wherein the third plurality of application icons is a subset of the second plurality of application icons.

58. The method of claim 24, wherein the received first input is a first received input in a first direction, the method further comprising:
  receiving a third input based on a second movement of the physical crown, wherein the second movement is a rotation in the first direction; and
  in response to the received third input, launching an application associated with an application icon of the second plurality of application icons.

59. The method of claim 24, further comprising:
  receiving information representing an activity in an application, wherein the application corresponds to a displayed application icon; and
  in response to the received information, altering an appearance of the displayed application icon.

60. The method of claim 59, wherein the altering is one or more of blinking, changing color, and animating.

61. The method of claim 24, wherein the first plurality of icons includes a top-right application icon and the top-right icon of the first plurality of application icons is not displayed as part of the second plurality of application icons.

62. The method of claim 24, wherein the first plurality of icons includes a top-right application icon and the top-right icon of the first plurality of application icons is displayed as a left-most application icon in a second top-most row in the second plurality of application icons.

63. The method of claim 62, wherein the replacing of the display of the first plurality of application icons to the second plurality of application icons comprises:
  translating an application icon of the first plurality of application icons, from a first position of the touch-sensitive display, to a second position of the touch-sensitive display,
  wherein the application icon is displayed, in whole, on the touch-sensitive display during the translating.

64. The method of claim 62, wherein the replacing of the display of the first plurality of application icons to the second plurality of application icons comprises:
  displaying, at a first position of the touch-sensitive display, only a portion of an application icon of the first plurality of application icons; and
  displaying the remaining portion of the application icon in a second position of the touch-sensitive display, wherein the first position and the second position are separate.

65. The method of claim 24, wherein the physical crown is a mechanical crown.

66. The method of claim 24, further comprising:
  detecting a force applied to the touch-sensitive display; and
  replacing the first plurality of application icons based on the detected force.

* * * * *

UNITED STATES PATENT AND TRADEMARK OFFICE
CERTIFICATE OF CORRECTION

PATENT NO.       : 10,545,657 B2                                    Page 1 of 1
APPLICATION NO.  : 15/049052
DATED            : January 28, 2020
INVENTOR(S)      : Nicholas Zambetti et al.

It is certified that error appears in the above-identified patent and that said Letters Patent is hereby corrected as shown below:

On the Title Page

Under "Related U.S. Application Data", Line 2, delete "and" and insert -- which is --, therefor.

In the Claims

In Claim 24, Column 17, Line 21, delete "swine," and insert -- swipe --, therefor.

Signed and Sealed this
Fifteenth Day of October, 2024

Katherine Kelly Vidal
*Director of the United States Patent and Trademark Office*